(12) United States Patent
Yamamoto et al.

(10) Patent No.: US 11,829,617 B2
(45) Date of Patent: *Nov. 28, 2023

(54) VIRTUAL STORAGE SYSTEM

(71) Applicant: HITACHI, LTD., Tokyo (JP)

(72) Inventors: Akira Yamamoto, Tokyo (JP); Hiroaki Akutsu, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 114 days.

This patent is subject to a terminal disclaimer.

(21) Appl. No.: 17/191,812

(22) Filed: Mar. 4, 2021

(65) Prior Publication Data
US 2021/0240370 A1    Aug. 5, 2021

Related U.S. Application Data

(63) Continuation of application No. 16/597,967, filed on Oct. 10, 2019, now Pat. No. 10,956,063, which is a
(Continued)

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0608* (2013.01); *G06F 3/0664* (2013.01)

(58) Field of Classification Search
CPC .... G06F 3/0631; G06F 3/0604; G06F 3/0608; G06F 3/0664; G06F 3/067
See application file for complete search history.

(56) References Cited

U.S. PATENT DOCUMENTS 7,698,501 B1 *  4/2010  Corbett ............... H04L 67/1095
                                                   711/E12.078
7,778,960 B1 *  8/2010  Chatterjee ............. G06F 16/214
                                                           707/802
(Continued)

FOREIGN PATENT DOCUMENTS

JP    2007-115232 A    5/2007
JP    2008-186172 A    8/2008
(Continued)

OTHER PUBLICATIONS

International Search Report of PCT/JP2016/055968 dated May 10, 2016.
(Continued)

*Primary Examiner* — Craig S Goldschmidt
(74) *Attorney, Agent, or Firm* — MATTINGLY & MALUR, PC

(57) ABSTRACT

A virtual storage system according to an aspect of the present invention includes multiple storage systems each including: a storage controller that accepts a read/write request for reading or writing from and to a logical volume; and multiple storage devices. The storage system defines a pool that manages the storage device capable of allocating any of storage areas to the logical volume, and manages the capacity (pool capacity) of the storage areas belonging to the pool, and the capacity (pool available capacity) of unused storage areas in the pool. Furthermore, the storage system calculates the total value of the pool available capacities of the storage systems included in the virtual storage system, and provides the server with the total value as the pool available capacity of the virtual storage system.

9 Claims, 25 Drawing Sheets

Related U.S. Application Data continuation of application No. 15/646,364, filed on Jul. 11, 2017, now Pat. No. 10,452,293, which is a continuation of application No. PCT/JP2016/055968, filed on Feb. 29, 2016.

(56) References Cited

U.S. PATENT DOCUMENTS

| | | |
|---|---|---|
| 2004/0153481 A1 | 8/2004 | Talluri |
| 2007/0271413 A1 | 11/2007 | Fujibayashi |
| 2008/0184000 A1 | 7/2008 | Kawaguchi |
| 2009/0049546 A1 | 2/2009 | Verma |
| 2010/0205390 A1 | 8/2010 | Arakawa |
| 2011/0145499 A1 | 6/2011 | Ananthanarayanan |
| 2012/0023305 A1* | 1/2012 | Satoyama ............ G06F 3/0604 711/170 |
| 2012/0059989 A1 | 3/2012 | Hamaguchi |
| 2012/0159005 A1 | 6/2012 | D'Amato |
| 2012/0331249 A1* | 12/2012 | Benjamin ............ G06F 3/0607 711/E12.103 |

FOREIGN PATENT DOCUMENTS

| | | |
|---|---|---|
| JP | 2010-186471 A | 8/2010 |
| WO | 2011/135635 A1 | 11/2011 |
| WO | 2014/147657 A1 | 9/2014 |

OTHER PUBLICATIONS

Japanese Office Action received in corresponding Japanese Application No. 2022-086657 dated May 16, 2023.

\* cited by examiner

Fig. 5

| SERVER PORT IDENTIFIER | -24000 |
| --- | --- |
| LOGICAL VOLUME IDENTIFIER | -24001 |
| STORAGE SYSTEM IDENTIFIER | -24002 |
| STORAGE PORT IDENTIFIER | -24003 |
| ⋮ | |
| LOGICAL VOLUME IDENTIFIER | -24001 |
| STORAGE SYSTEM IDENTIFIER | -24002 |
| STORAGE PORT IDENTIFIER | -24003 |

SERVER PORT INFORMATION 198

Fig. 7

| | |
|---|---|
| VIRTUAL STORAGE SYSTEM IDENTIFIER | — 2051 |
| REAL STORAGE SYSTEM IDENTIFIER | — 2052 |
| VIRTUAL STORAGE STORAGE CAPACITY | — 2053 |
| TOTAL REAL STORAGE STORAGE CAPACITY | — 2054 |
| TOTAL AVAILABLE STORAGE CAPACITY | — 2055 |
| REAL STORAGE STORAGE CAPACITY | — 2056 |
| POOL CAPACITY | — 2058 |
| AVAILABLE STORAGE CAPACITY | — 2057 |

STORAGE SYSTEM INFORMATION 2050

Fig. 8

| | |
|---|---|
| VIRTUAL STORAGE SYSTEM IDENTIFIER | — 2071 |
| OTHER REAL STORAGE SYSTEM IDENTIFIER | — 2072(2072-1) |
| STORAGE PORT IDENTIFIER | — 2073(2073-1) |
| ⋮ | |
| STORAGE PORT IDENTIFIER | — 2073(2073-1) |
| ⋮ | |
| OTHER REAL STORAGE SYSTEM IDENTIFIER | — 2072(2072-k) |
| STORAGE PORT IDENTIFIER | — 2073(2073-k) |
| ⋮ | |
| STORAGE PORT IDENTIFIER | — 2073(2073-k) |
| ⋮ | |

OTHER REAL STORAGE SYSTEM INFORMATION 2070

VIRTUAL LOGICAL VOLUME INFORMATION 2040

LOGICAL VOLUME INFORMATION 2000

Fig.11

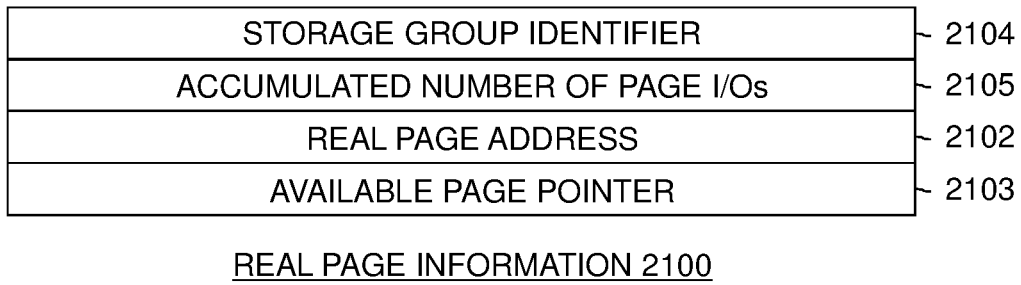

| STORAGE GROUP IDENTIFIER | ~ 2104 |
| ACCUMULATED NUMBER OF PAGE I/Os | ~ 2105 |
| REAL PAGE ADDRESS | ~ 2102 |
| AVAILABLE PAGE POINTER | ~ 2103 |

REAL PAGE INFORMATION 2100

Fig.12

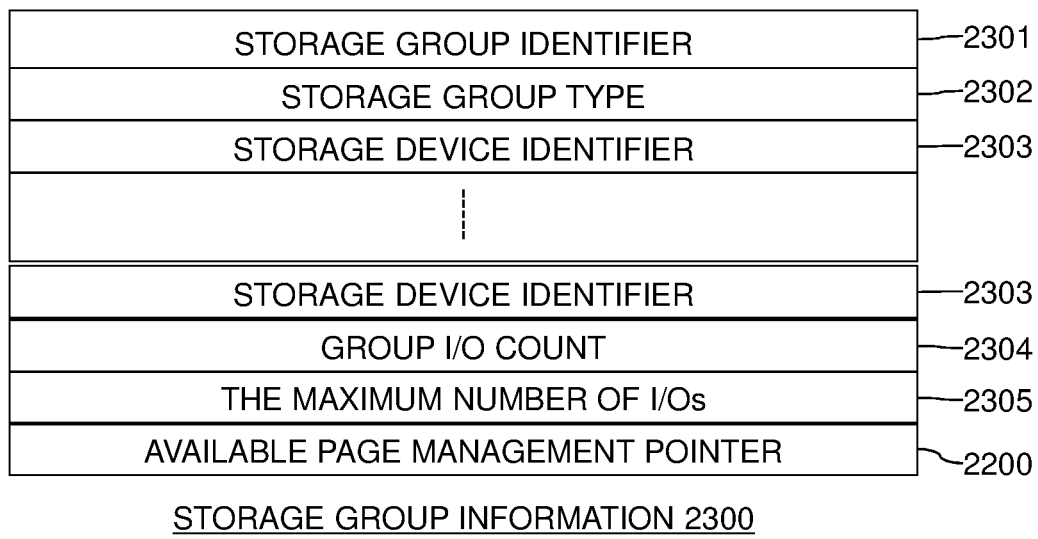

| STORAGE GROUP IDENTIFIER | —2301 |
| STORAGE GROUP TYPE | —2302 |
| STORAGE DEVICE IDENTIFIER | —2303 |
| ⋮ | |
| STORAGE DEVICE IDENTIFIER | —2303 |
| GROUP I/O COUNT | —2304 |
| THE MAXIMUM NUMBER OF I/Os | —2305 |
| AVAILABLE PAGE MANAGEMENT POINTER | ~2200 |

STORAGE GROUP INFORMATION 2300

Fig.13

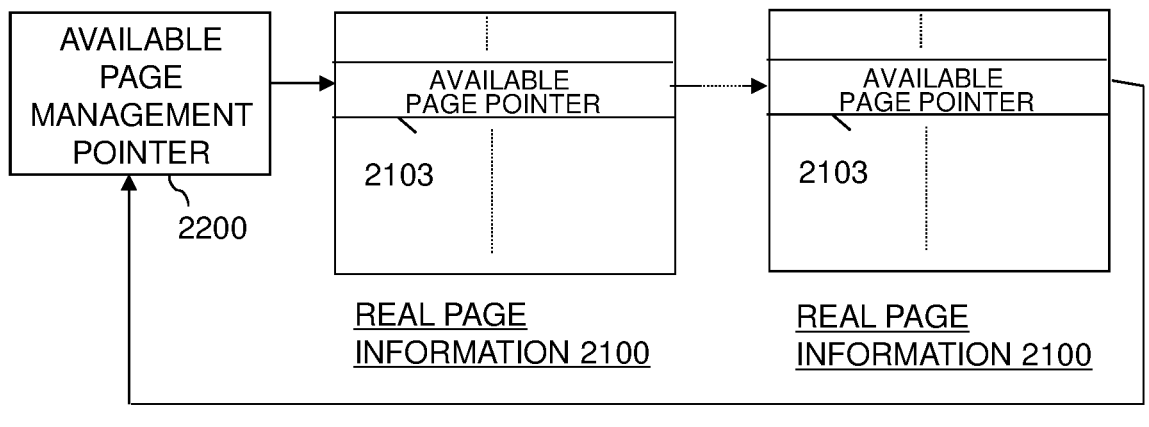

AVAILABLE REAL PAGE INFORMATION QUEUE

STORAGE DEVICE INFORMATION 2500

Fig.21
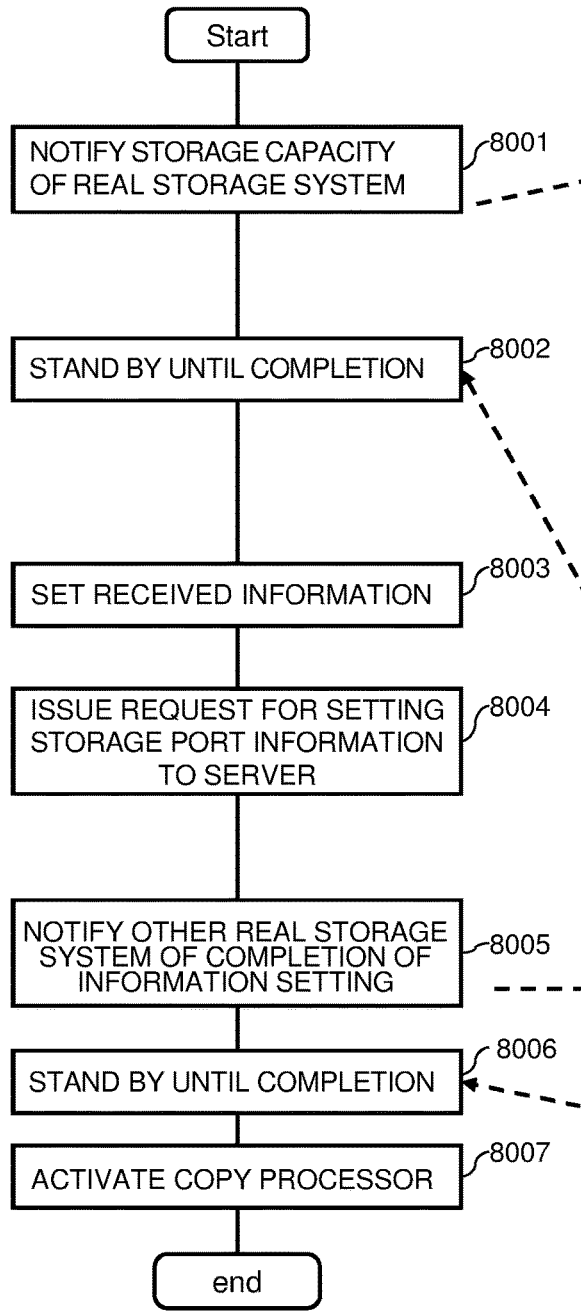
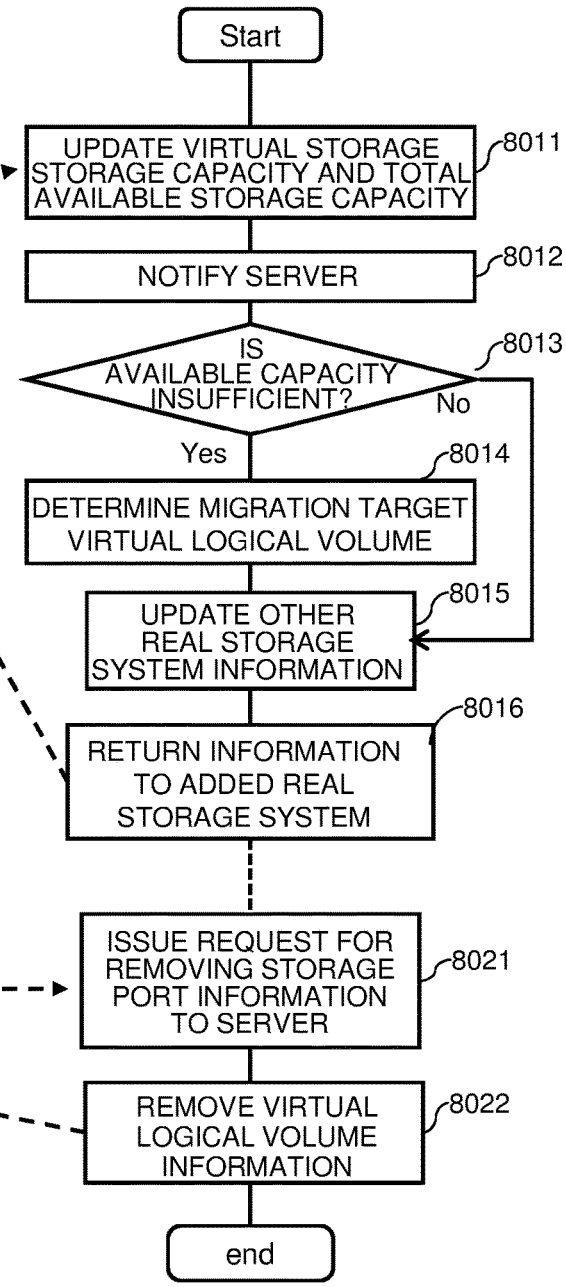

OTHER REAL STORAGE SYSTEM INFORMATION 2070'

Fig.25

| | |
|---|---|
| STORAGE GROUP IDENTIFIER | 2301 |
| STORAGE GROUP TYPE | 2302 |
| STORAGE DEVICE IDENTIFIER | 2303 |
| ⋮ | |
| STORAGE DEVICE IDENTIFIER | 2303 |
| GROUP I/O COUNT | 2304 |
| THE MAXIMUM NUMBER OF I/Os | 2305 |
| AVAILABLE PAGE MANAGEMENT POINTER | 2200 |
| IN-USE PAGE LIST | 2200' |
| ⋮ | 2200' |

STORAGE GROUP INFORMATION 2300'

Fig.30
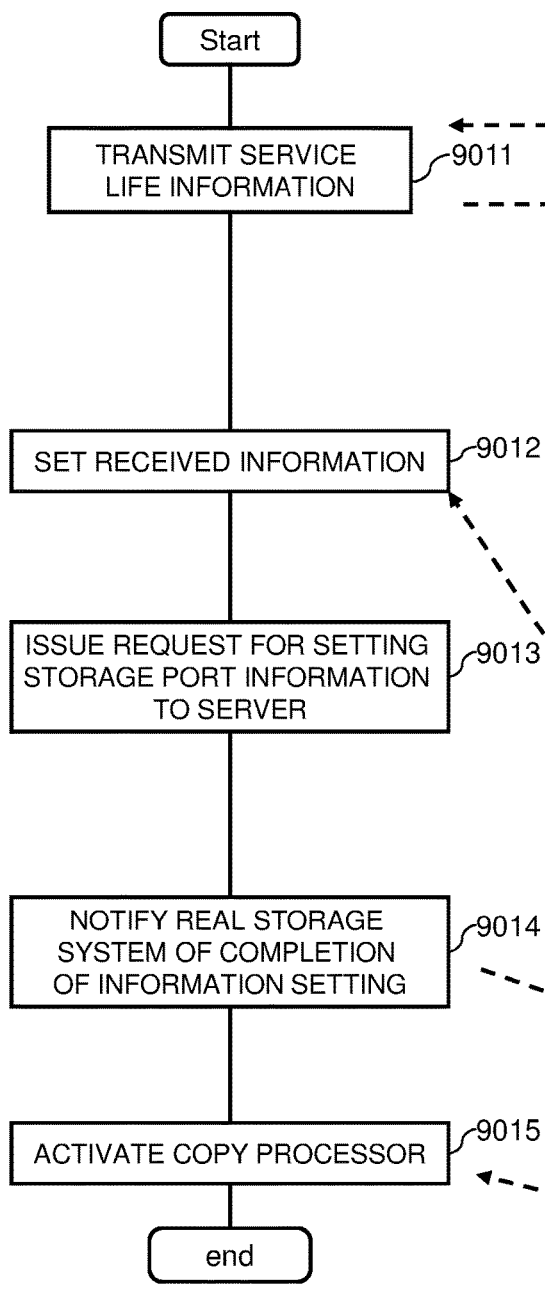
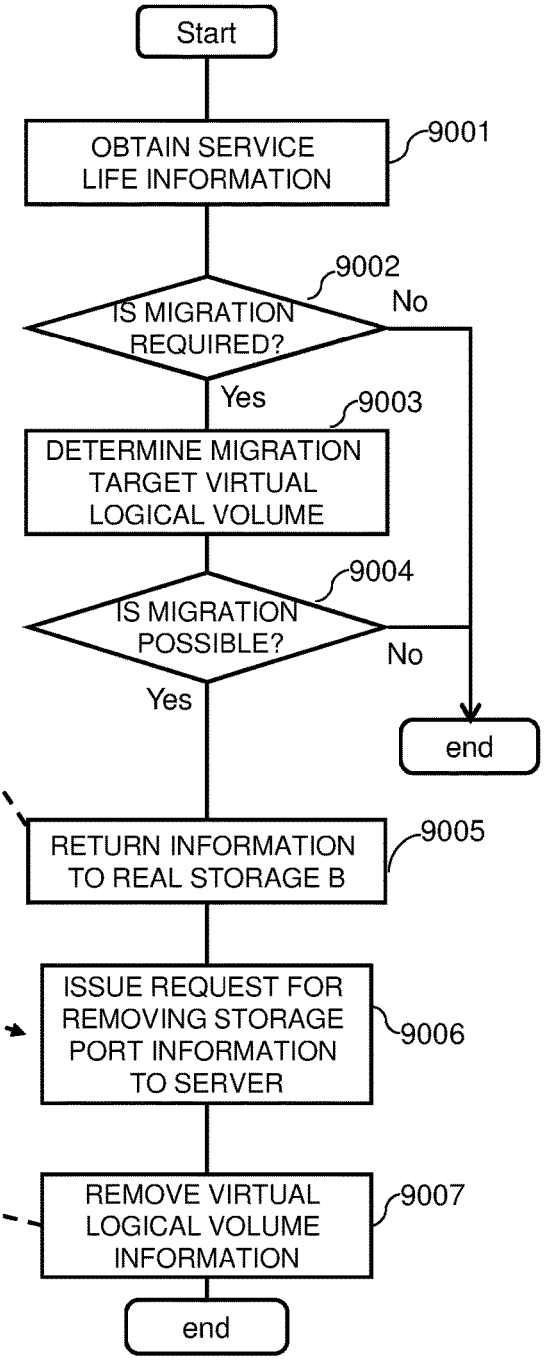

VIRTUAL STORAGE SYSTEM

TECHNICAL FIELD

The present invention relates to a storage system.

BACKGROUND ART

With rapid increase in electronic information dealt with in organizations, such as corporations, many storage systems have been introduced in each of information systems in the organizations and have been in operation. Techniques for enhancing the scalability of a storage system and for facilitating management include a virtualization technique.

For example, Patent Literature 1 discloses a technique called "virtual storage". The virtual storage is made up of multiple real storages. Each real storage has a virtual storage identifier and a real storage identifier. The virtual storage identifier is an identifier that the real storages constituting the virtual storage commonly have. The real storage identifiers are identifiers unique to the respective real storages that constitute the virtual storage. As to an LU (Logical Unit) that is a logical volume designated by a server in cases of reading and writing, the virtual storage has virtual LUNs (Logical Unit Numbers) and real LUNs. The virtual LUN is an identifier unique in the virtual storage. The real LUN is an identifier unique in the real storage. The characteristics of the virtual storage, for example, allow the multiple real storages to be dealt with apparently as a huge single virtual system. Further, when an old storage is replaced with a new storage, the real storage identifier is changed. In a case where the old storage and the new storage are configured to have the same virtual storage identifier, the server does not recognize the replacement of the storage. Consequently, the storage can be replaced without interruption of operation.

Patent Literature 1 further discloses a technique called 'capacity virtualization'. The capacity virtualization is also called thin provisioning. According to a capacity virtualization function, a storage system defines a storage area that is called a pool and has a relatively large capacity, and splits the storage area into sections that are called pages. The storage system secures no storage area when defining a logical volume, but allocates a page to a corresponding area when writing to the logical volume actually occurs. At an initial state, the amount of data to be written into the logical volumes is not large in many cases. Consequently, use of the capacity virtualization function can reduce the storage area to be prepared. The timing at which the storage area is allocated is a timing at which writing occurs. Accordingly, a user (administrator) of the storage system is not required to calculate the capacity of the logical volume rigorously, and the user is allowed to define a relatively large capacity instead. Consequently, the management cost can be also reduced.

CITATION LIST

Patent Literature

Patent Literature 1: WO2014/147657

SUMMARY OF INVENTION

Technical Problem

Conventionally, the storage system has not been shipped with storage devices as many as the storage system will accommodate. Instead, a method has been adopted that installs storage devices having a capacity required by the customer on the storage system and ships this system, and adds a storage device having a required capacity upon shortage of capacity. However, this method requires a maintenance cost. Recently, attention has been focused on a method of adding a storage system itself to an information system upon shortage of capacity.

When a user or an administrator of a storage system judges the necessity of adding a capacity, he or she adopts the available capacity of the pool (the amount of pages having not been allocated to logical volumes yet) as one of the determination criteria. In a case where multiple storage systems reside, the available capacity of the pool is required to be monitored for each storage system. The virtual storage technique described in Patent Literature 1 can handle multiple storage systems apparently as a single storage system, but does not consider the view of monitoring and managing the available capacity. Consequently, since the available capacity is required to be monitored for each storage system, a problem of complicating the management remains.

Solution to Problem

A virtual storage system according to one aspect of the present invention includes multiple storage systems each including: a storage controller that accepts a read/write request for reading or writing from and to a logical volume; and multiple storage devices. The storage system defines a pool that manages the storage device capable of allocating storage areas to the logical volume, and manages the capacity (pool capacity) of the storage areas belonging to the pool, and the capacity of unused storage areas in the pool (pool available capacity). Furthermore, the storage system calculates the total value of the pool available capacities of the storage systems included in the virtual storage system, and provides the server with the total value as the pool available capacity of the virtual storage system.

Advantageous Effects of Invention

The virtual storage system according to the one aspect of the present invention can handle the storage area of the virtual storage system that includes multiple storage systems as the storage area of a single storage system, thereby facilitating the management.

BRIEF DESCRIPTION OF DRAWINGS

FIGS. 4*a* and 4*b* are a conceptual diagram of data migration.

FIG. 5 is a diagram showing a configuration of server port information in Embodiment 1.

FIG. 7 is a diagram showing storage system information in Embodiment 1.

FIG. 8 is a diagram showing other real storage system information in Embodiment 1.

FIG. 11 is a diagram showing a format of real page information in Embodiment 1.

FIG. 12 is a diagram showing a format of storage group information in Embodiment 1.

FIG. 13 is a diagram showing a set of available real pages managed by an available page information pointer in Embodiment 1.

FIG. 21 is a diagram showing a processing flow of a real storage system addition processor in Embodiment 1.

FIG. 25 is a diagram showing a format of storage group information in Embodiment 2.

FIG. 30 is a diagram showing a processing flow of a system wear-leveling unit in a variation example.

DESCRIPTION OF EMBODIMENTS

Hereinafter, several embodiments are described with reference to the drawings.

In the following embodiments, a process executed in the storage system is sometimes described with a "program" being adopted as the subject of a sentence. In actuality, the process described in the program is performed through a processor (CPU) included in the storage system executing the program; thus the subject of the process is the processor (CPU). However, to prevent the description from being diffuse, the details of the process are sometimes described with the program being adopted as the subject of a sentence. A part of or the entire program may be implemented as dedicated hardware. Various programs described later may be provided through a program distribution server or a computer-readable storage medium, and installed in each apparatus that executes the programs. The computer-readable storage medium is a non-transitory computer-readable medium, and is a non-volatile storage medium, such as an IC card, an SD card or a DVD, for example.

Embodiment 1

Figure 1:
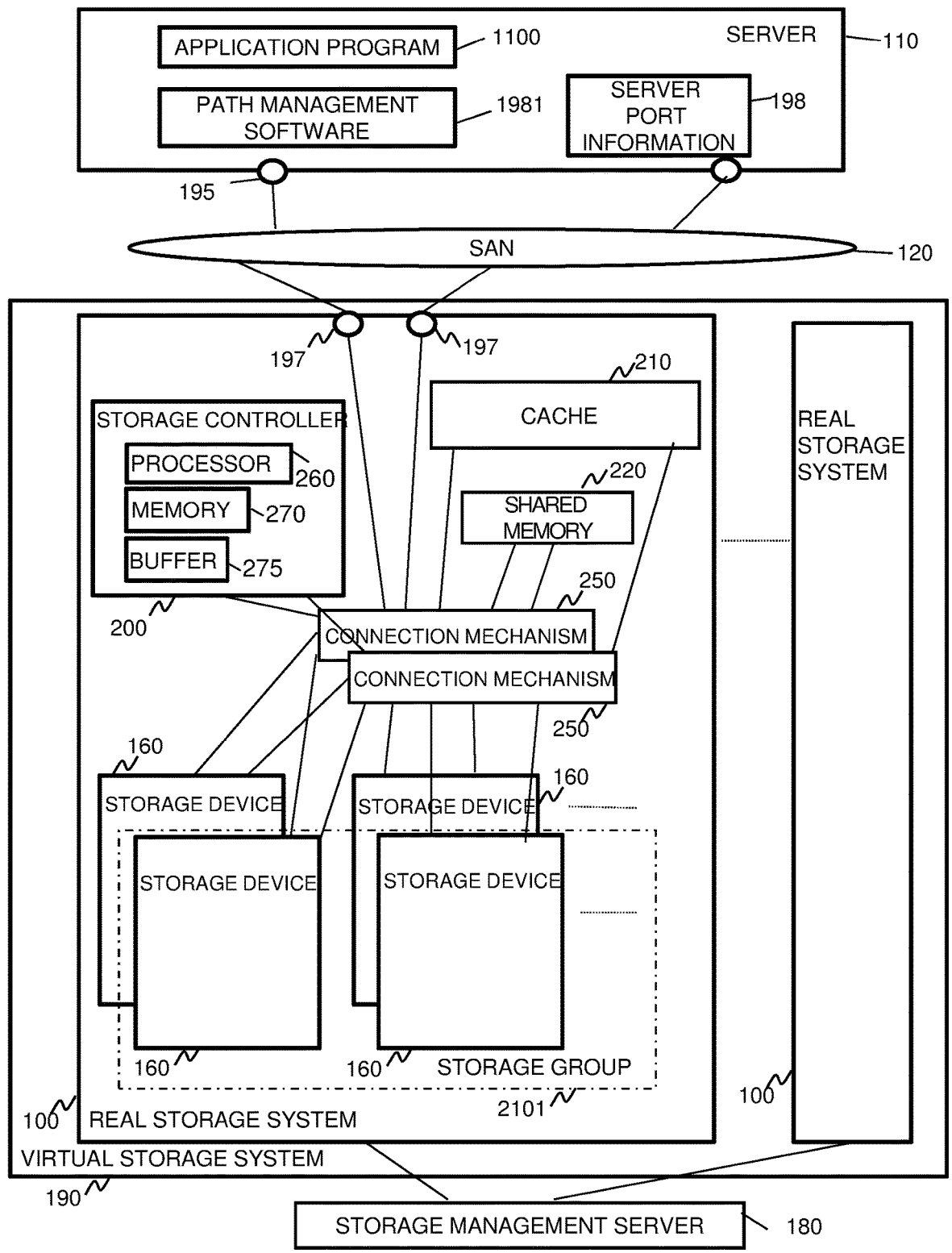
FIG. 1 is a diagram showing a configuration of an information system in Embodiment 1.

FIG. 1 is a diagram showing a configuration of an information system in Embodiment 1. The information system includes one or more real storage systems 100, one or more servers 110, a SAN (Storage Area Network) 120 that connects the real storage systems 100 and the servers 110 to each other, and a storage management server 180. The servers 110 are connected to the SAN 120 through server ports 195, and the real storage systems 100 are connected to the SAN 120 through storage ports 197. The server 110 includes one or more server ports 195.

The real storage system 100 includes the one or more storage ports 197 connected to the SAN 120, one or more storage controllers 200 that execute read/write requests issued by the server 110, multiple storage devices 160 that store write data from the server 110, a cache 210 that stores data that is to be frequently read or written, a shared memory 220 that stores control data, and connection mechanisms 250 that integrally connect these devices to each other.

The storage devices 160 may be classified into some types. For example, an HDD (Hard Disk Drive) that includes magnetic disks as storage media, or a flash storage that includes flash memories as storage media may be adopted as the storage device 160. The flash memories included in the flash storages may be classified into some types, which include an SLC that is expensive and has high performance and a large number of erasable times, and an MLC that is inexpensive and has a low performance and a small number of erasable times.

In this embodiment, an example is described where the storage devices 160 included in the real storage systems 100 are HDDs or flash storages. The flash storage including SLC type flash memories is represented as "flash storage (SLC)", while the flash storage including MLC type flash memories is represented as "flash storage (MLC)". Alternatively, another embodiment may adopt storage devices 160 that includes new storage media, such as phase-change memories.

The server 110 is general-purpose computer, such as a personal computer (PC), and includes not only the server ports 195 but also a processor and a memory (not shown). The server 110 is a computer for executing an application program 1100 and the like used by a user, and accesses a volume provided by the real storage system 100 via the SAN 120. The real storage systems 100 also transmit and receive data to and from each other via the SAN 120. The SAN 120 is a network capable of data transmission based on a protocol that can transfer SCSI commands, and includes, for example, Fibre Channel or the like as a transfer medium.

The storage controller 200 includes a processor 260 that processes read/write requests issued by the server 110, a memory 270 that stores programs and information, and a buffer 275. The buffer 275 is used to store information required to generate redundant data, described later, and the generated redundant data, in a case of generating this data. The buffer 275 is also used as a temporary data storage area when data stored in the cache 210 is written in a storage device (storage device 160) that is to store the data permanently.

The cache 210 and the shared memory 220 are typically made up of volatile memories, such as DRAMs, but are non-volatilized by using a battery or the like. In this embodiment, to achieve high reliability, the cache 210 and the shared memory 220 are each duplexed. All data items to be written into the cache 210 or the shared memory 220 are each written into at least two areas. However, the present invention is effective even if the cache 210 and the shared memory 220 are not non-volatilized or duplexed.

The cache 210 stores data items frequently accessed from the storage controller 200 among the data items stored in the storage device 160. Upon acceptance of a write request issued by the server 110, the storage controller 200 returns a notification of completion of the write request to the server 110 when this controller writes, into the cache 210, the data received with an instruction of writing this data into the storage device 160. The data written in the cache 210 is stored (destaged) into the storage device 160 at an appropriate timing. Alternatively, another embodiment may store data received from the server 110 into the storage device 160 and subsequently return the notification of completion of the write request to the server 110.

Subsequently, a method of managing a storage area in the real storage system 100 according to this embodiment is described.

The storage controller 200 according to this embodiment has a Redundant Arrays of Inexpensive/Independent Disks/Device (RAID) function; according to this function, even in case any one of the multiple storage devices 160 fails, the data in the failed storage device 160 can be recovered. The storage controller 200 constitutes one RAID using some (for example, four, eight or the like) storage devices 160 included in the real storage system 100. A group of the storage devices 160 constituting the RAID is called a storage group 2101. In the real storage system 100 according to this embodiment, the single storage group 2101 includes the same type of storage devices 160. Even if the storage controller 200 does not have the RAID function, the present invention is effective.

The storage controller 200 according to this embodiment can define logical volumes and virtual logical volumes as storage space other than the storage group 2101. First, the logical volume is described. The storage controller 200 can define multiple logical volumes. Each logical volume is assigned an identification number unique in the real storage system 100. This number is called a logical volume identifier (or logical volume ID).

The real storage system 100 according to this embodiment has a capacity virtualization function. The logical volume is a storage space formed by the capacity virtualization function. When the logical volume is defined, the storage destination of data to be written in each storage area in the logical volume is not determined. Upon acceptance of a write request for writing into the logical volume, the storage controller 200 determines the storage destination of data to be written in a write target area (an area designated by the write request). Hereinafter, a process of determining the storage destination of data to be written into the write target area (the area designated by the write request) is represented as "allocating".

Figure 2:
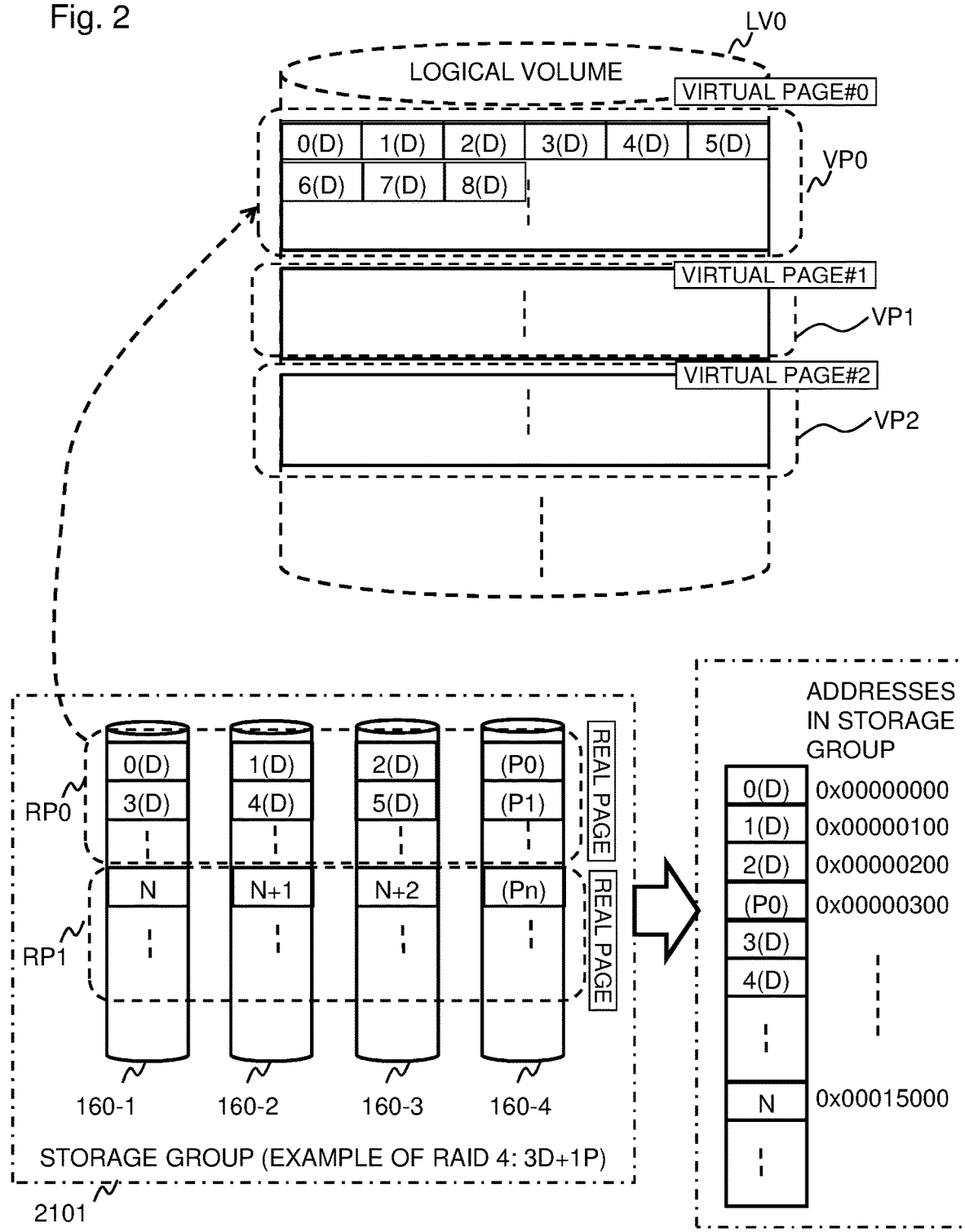
FIG. 2 is a diagram showing the relationship between a logical volume and a storage group.

Referring to FIG. 2, the relationship between the logical volume and the storage group 2101 is described. For management of a storage area allocated to the logical volume ("LV0"), the storage controller 200 splits the logical volume into areas that have a predetermined unit and are called virtual pages (VP0, VP1 and VP2 in FIG. 2) and performs the management. When the storage area is allocated to the logical volume, the storage controller 200 allocates the storage area in each virtual page. Each virtual page is assigned an identification number unique in the logical volume. The identification number is called a virtual page number (or sometimes represented as "virtual page #"). A virtual page having a virtual page number n is represented as "virtual page #n".

The virtual page is a concept used only to manage the storage space of the logical volume in the storage controller 200. When the server 110 accesses the storage area of the logical volume, the server 110 identifies the access-target storage area using an address, such as LBA (Logical Block Address). When the server 110 issues a logical volume access request, the storage controller 200 converts the LBA designated by the server 110 into a virtual page number and a relative address in the virtual page (an offset address from the beginning of the virtual page). This conversion can be achieved by dividing the LBA by the virtual page size. If the virtual page size is P (MB), an area of P (MB) from the beginning of the logical volume is managed as a virtual page #0. The next area of P (MB) is managed as a virtual page #1. Likewise, areas each having P (MB) thereafter are managed as virtual pages #2, #3, . . . .

Immediately after the storage controller 200 defines the logical volume, no physical storage area is allocated to each virtual page. Upon acceptance of a virtual page write request issued by the server 110, the storage controller 200 allocates the physical storage area to the virtual page. The physical storage area allocated to the virtual page is called a real page. The real page is a storage area in the storage group 2101. FIG. 2 shows a state where the real page RP0 is allocated to the virtual page #0 (VP0).

The real pages are areas formed using the storage areas in the multiple storage devices 160 in the storage group 2101. In FIG. 2, reference numerals 160-1, 160-2, 160-3 and 160-4 denote the storage areas in the respective storage devices 160. The RAID type of the storage group 2101 exemplified in FIG. 2 is a 3D+1 P configuration (RAID including three data drives and one parity drive) of the RAID 4.

The storage controller 200 splits the storage area of each storage device 160 belonging to the storage group 2101 into multiple storage areas that have a fixed size and are called stripe blocks, and performs the management. For example, in FIG. 2, each of the areas represented as 0(D), 1(D), 2(D), . . . , or P0, P1, . . . is the stripe block.

In FIG. 2, among the stripe blocks, the stripe blocks denoted as P0, P1, . . . are stripe blocks that store redundant data (parities) generated by the RAID function and are called "parity stripes". On the other hand, the stripe blocks denoted as 0(D), 1(D), 2(D), . . . are stripe blocks that store data (data that is not redundant data) written by the server 110. The stripe blocks are called "data stripes". The parity stripe stores the redundant data generated using multiple data stripes.

Hereinafter, a set of a parity stripe and data stripes used to generate redundant data to be stored in the parity stripe is called a "stripe line". The case where the real storage system 100 according to this embodiment has a relationship where, for example, the parity stripe P0 stores the redundant data (parity) generated using the data stripes 0(D), 1(D) and 2(D). The data stripes 0(D), 1(D) and 2(D) and the parity stripe P0 belong to the identical stripe line.

That is, the stripe blocks belonging to the identical stripe line reside at the same positions (addresses) in the respective storage devices (160-1, 160-2, 160-3 and 160-4). Alternatively, another embodiment may adopt a configuration where the stripe blocks belonging to the identical stripe line reside at different addresses in the flash volume. In the real storage system 100 according to this embodiment, the real pages (for example, RP0 and RP1) are each made up of one or more stripe lines, as shown in FIG. 2.

The storage controller 200 manages storage areas (blocks) in the storage group 2101 as a storage space identifiable by a one-dimensional address. Hereinafter, this storage space is called "storage space of the storage group", and the addresses in this storage space are called "addresses in the storage group" or "storage group addresses". An example of the storage group addresses is shown in FIG. 2. As shown in FIG. 2, the storage space of the storage group is a storage space where the stripes in the storage group 2101 are arranged sequentially on a one-by-one basis. The storage group address of the beginning stripe block in the storage group is defined as 0. Each of stripe blocks thereafter are assigned addresses as shown in FIG. 2, for example. The addresses in the storage group are used to manage the correspondence relationship between the real pages and the storage area in the storage group 2101.

When the real page is allocated to the virtual page, only the data stripes (0(D), 1(D) or the like) are allocated and no parity stripe is allocated. Consequently, a relationship holds where the total size of areas in the real page where write data is stored is equal to the size of the virtual page. That is, the relationship holds where (the size of real page–the size of parity storing area)=the virtual page size. FIG. 2 only shows the configuration example of RAID 4. For example, in a case where the RAID type of the storage group 2101 is RAID 1, the real page size is twice as large as the virtual page size (virtual page capacity 2600).

The relationship between the areas in the virtual page and the areas in the real page (mapping) is as shown in FIG. 2. That is, the areas (0(D), 1(D) and 2(D)) obtained by removing the parity from the beginning stripe of the real page are allocated to the beginning area of the virtual page. Likewise, subsequently, the areas (3(D), 4(D), 5(D), . . . ) obtained by removing the parity from the second stripe of the real page and thereafter are sequentially allocated to the areas of the virtual page.

Thus, mapping between the areas in the virtual page and the areas in the real page is regular mapping. Consequently, by obtaining the virtual page number and the relative address in the virtual page (the offset address from the beginning of the virtual page) from the access location (LBA) in the logical volume designated by the access request issued by the server 110, the real storage system 100 can uniquely specify the storage device 160 and the area (data stripe) in this storage device 160 associated with the access location. In addition to the data stripe associated with the access location, the parity stripe belonging to the same stripe line as the data stripe does is also uniquely determined. However, the mapping between the areas in the virtual page and the areas in the real page is not limited to the mapping method described here.

The real pages allocated to the virtual pages in one logical volume are not necessarily limited to the real pages in the identical storage group 2101. The real page allocated to the virtual page #0 and the real page allocated to the virtual page #1 may be real pages in different storage groups 2101.

The real storage system 100 defines and manages a set of storage groups 2101 having areas (real pages) to be allocated to the virtual pages. The set of the storage groups 2101 is called "pool". When the real storage system 100 allocates a real page to a virtual page, this system selects one storage group 2101 belonging to the pool and allocates a real page included in the storage group 2101.

The real page to be allocated to the virtual page is required to be a real page having not been allocated to another virtual page yet. The real page having not been allocated to any virtual page yet is called "available page" or "available real page". After the pool runs out of available pages, the real page cannot be allocated to the virtual page. Consequently, the real storage system 100 always manages the amount of available pages in the pool.

Subsequently, the relationship between the virtual storage system and the real storage system, and the relationship between the virtual logical volume and the logical volume are described. In the information system according to this embodiment, at least one virtual storage system 190 made up of one or more real storage systems 100 resides. The virtual storage system 190 is recognized as a single storage system by the server 110.

The real storage system 100 has the identifier of the apparatus (called a real storage system identifier). The identifier is different for each storage system 100. As to the real storage system 100 according to this embodiment, the real storage systems 100 belonging to the identical virtual storage system 190 have an identifier called a virtual storage identifier. The real storage systems 100 belonging to the identical virtual storage system 190 have the same virtual storage identifier.

The virtual logical volume is a storage space that the server 110 can recognize and access. As with the logical volume, the virtual logical volume is assigned an identifier. The identifier is called "virtual logical volume identifier". Alternatively, the identifier may sometimes be called a virtual logical volume ID or VVID. The virtual logical volume identifier is an identifier unique in the virtual storage system 190.

Figure 3:
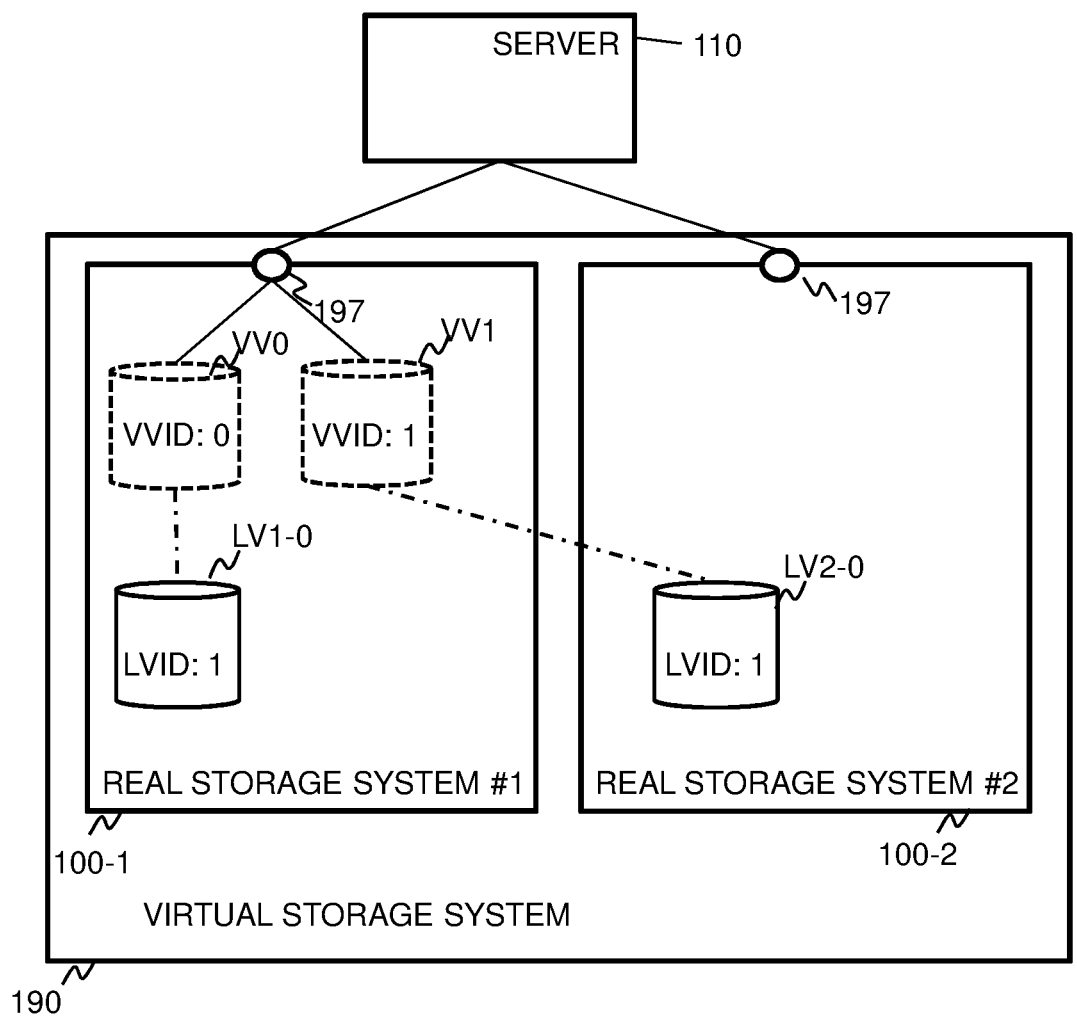
FIG. 3 is a diagram showing the relationship between a virtual logical volume and the logical volume.

The virtual logical volume is associated with at least one logical volume (sometimes represented as "mapped"). FIG. 3 shows an example. In FIG. 3, reference signs VV0 and VV1 denote virtual logical volumes, and reference signs LV1-0 and LV2-0 denote logical volumes. Reference sign LV1-0 denotes a logical volume included in the real storage system #1 (100-1). Reference sign LV2-0 denotes a logical volume included in the real storage system #2 (100-1). Reference sign VV0 is associated with the logical volume LV1-0. Reference sign VV1 is associated with the logical volume LV2-0. In FIG. 3, the virtual logical volumes VV0 and VV1 are defined in the real storage system #1.

When the server 110 issues an I/O request to the virtual logical volume VV0, for example, the real storage system receiving this I/O request (the real storage system #1 (100-1) in FIG. 3) converts the I/O request into an I/O request destined for the logical volume LV1-0 associated with the virtual logical volume VV0.

The size of the virtual logical volume is the same as the size of the logical volume associated with the virtual logical volume. In this embodiment, when the real storage system 100 accepts, from the server 110, an access request for accessing a certain address (for example, the address x) in the virtual logical volume, the real storage system 100 converts the access request into an I/O request for the address x in the virtual logical volume.

The virtual logical volume may be associated with the logical volume included in a real storage system 100 other than the real storage system 100 where the virtual logical volume is defined. In the example in FIG. 3, the virtual logical volume VV1 is associated with the logical volume LV2-0. In this case, when the server 110 issues an I/O request to the virtual logical volume VV1, the real storage system #1 converts the I/O request into an I/O request for the logical volume LV2-0. More specifically, the real storage system #1 issues an I/O request to the LV2-0 of the real storage system #2.

As described above, in the virtual storage system 190 according to this embodiment, the user (administrator) may define the virtual logical volume and the logical volume associated with the virtual logical volume in different real storage systems 100. Consequently, in a case where the amount of available pages is insufficient in the pool of the real storage system (the real storage system #1 in the example in FIG. 3) in which the virtual logical volume is defined, by associating the logical volume of another real storage system 100 (the real storage system #2 in the example in FIG. 3) with the virtual logical volume, the virtual logical volume can be defined when an available page resides in any real storage systems 100 in the virtual storage system 190.

The virtual storage system 190 according to this embodiment has a function of managing the total of the amounts of pages included in the multiple real storage systems 100 belonging to the virtual storage system 190 and the total of the amounts of available pages, as the amount of the pool of the virtual storage system 190 and the amount of available pages of the pool of the virtual storage system 190, respectively, and of notifying the server 110 or the storage management server 180 of the capacity of the pool of the virtual storage system 190 and the amount of available pages of the pool of the virtual storage system 190, as required (correctly, each real storage system 100 belonging to the virtual storage system 190 manages the amount of the pool of the virtual storage system 190 and the amount of available pages of the pool of the virtual storage system 190. Any real storage system 100 belonging to the virtual storage system 190 may notify the server 110 or the storage management server 180 of the capacity of the pool of the virtual storage system 190 and the amount of available pages in the pool of the virtual storage system 190).

In the information system including multiple conventional storage systems without any concept of the virtual storage system, the individual storage systems notify the server 110 or the storage management server 180 of the amounts of available pages of the own storage systems, and the user (or administrator) determines a location (storage system) where the logical volume is to be defined or determines the necessity of additionally providing a storage system, on the basis of the amounts of available pages of the respective storage systems.

On the other hand, in the virtual storage system 190 according to this embodiment, the (virtual) logical volume can be defined when available pages are in any real storage system 100 in the virtual storage system 190. Accordingly, the virtual storage system 190 notifies the user (administrator) only of the amount of available pages in the pool of a single (virtual) storage system that is the virtual storage system 190 and thus the user (administrator) is only required to monitor and grasp the available capacity of the pool of the single virtual storage system 190.

Figure 4A:
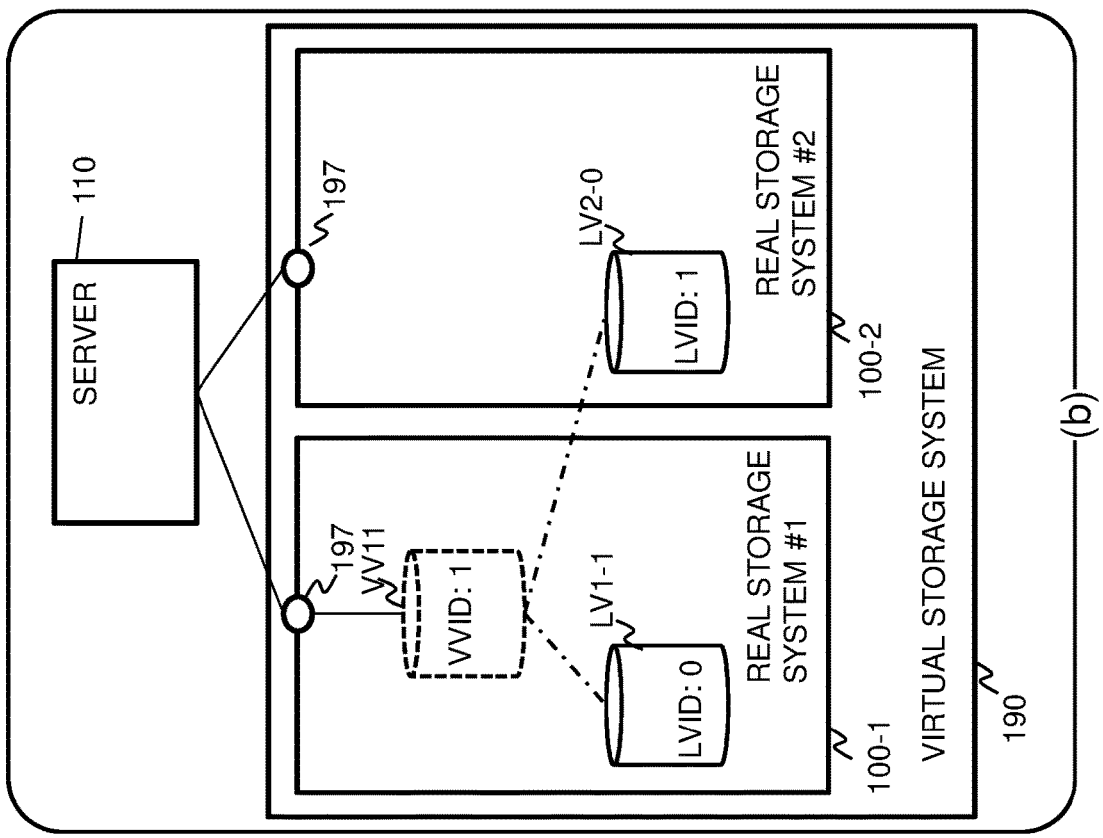
[FIGS. 4*a* and 4*b*]
Figure 4B:
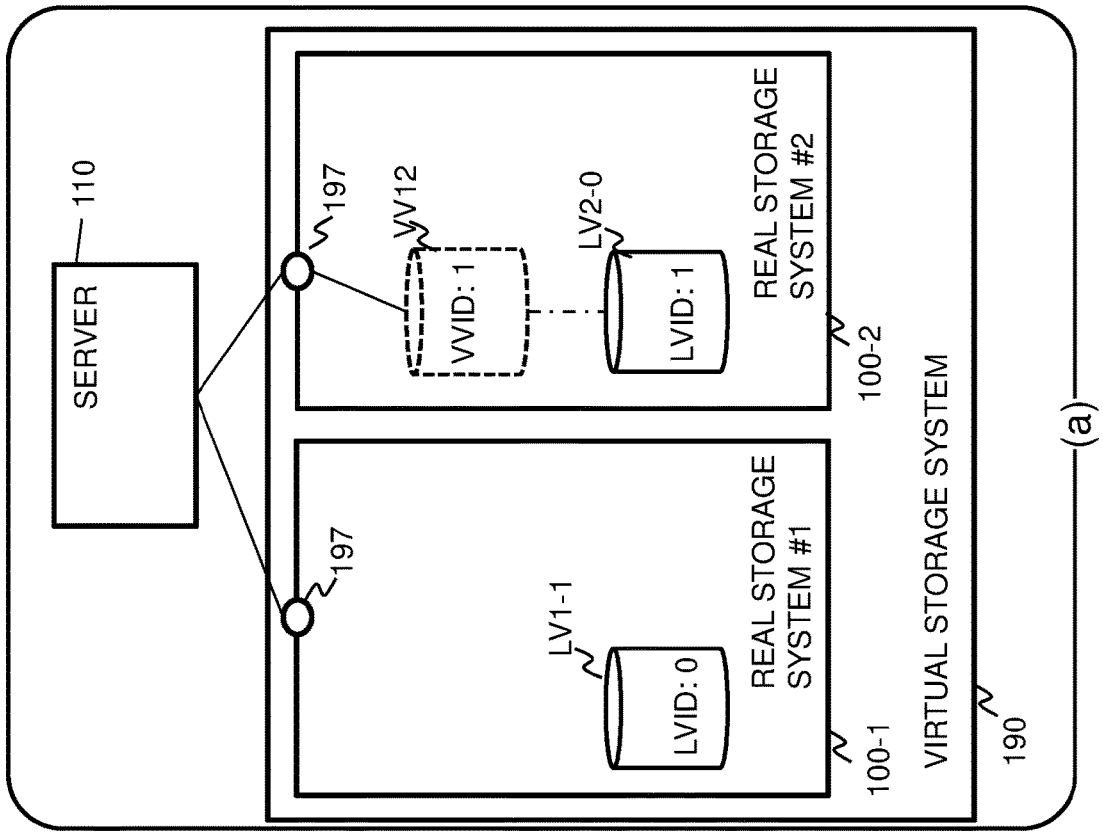

The configuration where the virtual logical volume is associated with the logical volume included in the real storage system 100 other than the real storage system 100 where the virtual logical volume is defined is used also for data migration between the real storage systems 100. Referring to FIG. 4, an example of data migration is described.

In FIG. 4(*a*), the real storage system #2 includes the virtual logical volume VV12 and the logical volume LV2-0 associated therewith. The VVID of the virtual logical volume VV12 is 1.

A configuration of migration of data in the logical volume LV2-0 to the logical volume (for example, the logical volume LV1-1) of the real storage system #1 is shown in FIG. 4(*b*). Here, the sizes of the logical volume LV1-1 and the logical volume LV2-0 are required to be equal to each other.

In a case of migration, the real storage system #1 creates the virtual logical volume VV11, and the VVID of the virtual logical volume VV11 is configured to be 1, which is the same as that of the virtual logical volume VV12. The real storage system #1 copies the data in the logical volume LV2-0 to the logical volume LV1-1, and associates the logical volume LV1-1 with the virtual logical volume VV11. The real storage system #2 then removes the virtual logical volume VV12.

When the server 110 recognizes the virtual logical volume, the server 110 obtains information on the virtual logical volume from the real storage system 100. Here, the information obtained from the real storage system 100 contains the VVID and the virtual storage system identifier. Since the virtual logical volume VV11 and the virtual logical volume VV12 have the same VVID and virtual storage system identifier, the server 110 recognizes that the virtual logical volume VV11 and the virtual logical volume VV12 are the same volume in the single storage system (that is, recognizes that the VV11 and the VV12 are the volume in the virtual storage system 190 and are the same volume). Consequently, even if the data is migrated from the real storage system #1 to the real storage system #2 and the virtual logical volume VV12 is removed, the server 110 can continue the operation without stopping access (the server 110 accesses the virtual logical volume VV11 instead of the virtual logical volume VV12).

Even if the virtual logical volume and the logical volume associated with this virtual logical volume are defined in different real storage systems 100, the server 110 can access the data in the (virtual) logical volume. Consequently, although the data is not necessarily migrated between the logical volumes, it is advantageous, in access performance, that the logical volume associated with the virtual logical volume be in the real storage system 100 identical to that of the virtual logical volume. Consequently, it is desirable that the configuration be changed so that the logical volume associated with the virtual logical volume can be arranged in the same real storage system 100 as the virtual logical volume can.

In FIG. 4(*b*), two logical volumes (LV1-1 and LV2-0) are associated with the virtual logical volume VV11. To make an I/O request issued by the server 110 acceptable even during migration of data in the logical volume, the virtual storage system 190 according to this embodiment allows two logical volumes to be temporarily associated with the single virtual logical volume. In actuality, the real storage system 100 performs a migration process in an order slightly different from the order described above. This is to allow the I/O request issued by the server 110 and destined for the virtual logical volume to be acceptable even during migration of the data in the logical volume. The details of the data migration process are described later.

In the following description, between the two logical volumes associated with the virtual logical volume, the data migration source logical volume is called "old logical volume" and the data migration destination logical volume is called "current logical volume". In the example in FIG. 4, the data is migrated from the logical volume LV2-0 to the logical volume LV1-1. In this case, the logical volume LV2-0 is the old logical volume and the logical volume LV1-1 is the current logical volume.

Subsequently, the contents of management information included in the server 110 and the real storage system 100 are described. FIG. 5 shows a format of server port information 198. The server port information 198 is information that is stored in the memory of the server 110 and is provided for each server port 195. The server port information 198 is information used to identify the server port 195 and the storage port 197 that are used to transmit a request when path management software 1981 issues a read/write request to the real storage system 100. When the server 110 issues the read/write request to the real storage system 100, the server 110 designates the identifier of the storage system, the identifier of the (virtual) logical volume, and the identifier of the storage port. Thus, the server port information 198 contains a server port identifier 24000, a logical volume identifier 24001 of a logical volume that is a target of issuance of an access request by the server 110 via the server port 195, an identifier 24002 of a storage system containing the logical volume, and a storage port identifier 24003. In a case where multiple logical volumes serving as targets to which the server 110 issues an access request reside, multiple logical volume identifiers 24001 are contained in the server port information 198.

In a case where the logical volume is connected to multiple storage ports 197, multiple storage port identifiers 24003 are set with respect to one logical volume identifier 24001. In this embodiment, the storage system identifier 24002 is set to the identifier of the virtual storage system 190. The logical volume identifier 24001 is set to the identifier of the virtual logical volume. The storage port identifier 24003 is set to the identifier of the storage port 197 of the real storage system 100 in which the virtual logical volume is defined.

The read/write request by the server 110 contains at least the identifier of the virtual logical volume and the identifier of the storage port 197. The read/write request may contain information other than the identifiers and, for example, may contain the identifier of the virtual storage system. Since the identifier of the storage port 197 has a real value (the identifier of the storage port 197 included in the real storage system 100), the real storage system 100 that receives the request is uniquely determined. In this embodiment, the real storage system 100 that processes the read/write request for reading or writing from and to the virtual logical volume is sometimes changed. Also in this case, the identifier of the virtual logical volume is unchanged, and only the connected storage port 197 is changed.

Figure 6:
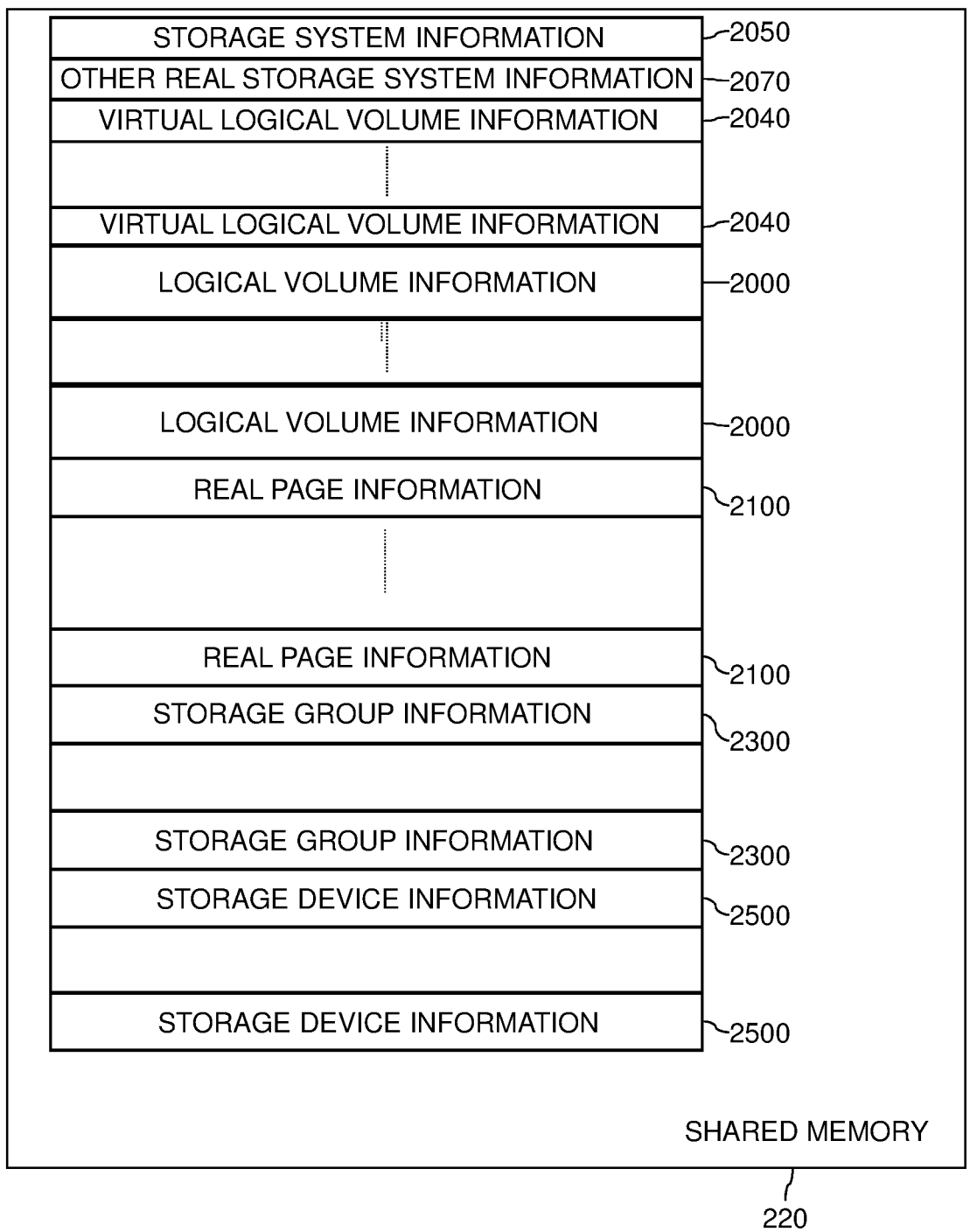
FIG. 6 is a diagram showing information stored in a shared memory of a storage system in Embodiment 1.

FIG. 6 shows information required to describe this embodiment in information stored in the shared memory 220 of the real storage system 100 in this embodiment. The shared memory 220 stores at least storage system information 2050, other real storage system information 2070, virtual logical volume information 2040, logical volume information 2000, real page information 2100, storage group information 2300, and storage device information 2500.

Among these pieces of information, as shown in FIG. 7, the storage system information 2050 is information pertaining to the real storage system 100 and the virtual storage system 190. In Embodiment 1, the information 2050 is information that contains a virtual storage system identifier 2051, a real storage system identifier 2052, a virtual storage storage capacity 2053, a total real storage storage capacity 2054, a total available storage capacity 2055, a real storage storage capacity 2056, an available storage capacity 2057, and a pool capacity 2058. The virtual storage system identifier 2051 is the identifier of the virtual storage system 190 that includes the real storage system 100. The real storage system identifier 2052 is the identifier of the real storage system 100.

The virtual storage storage capacity 2053 is the capacity of the pool of the virtual storage system 190. The total real storage storage capacity 2054 is the total value of the capacities of the storage devices 160 included in the real storage systems 100 constituting the virtual storage system 190. The total available storage capacity 2055 is the available capacities of the pool in the virtual storage system 190. The available capacity is the total capacities of real pages having not been allocated to any virtual page yet in the pool capacity. But in this embodiment, the pool capacity and the available capacity are represented using values obtained by converting the capacity (or available capacity) of the storage devices 160 belonging to the pool into the amount of virtual pages. For example, when the total of the capacity (in other words, the total amount of real pages) of the storage groups 2101 belonging to the pool of the virtual storage system 190 is 200 TB and the RAID types of all the storage groups 2101 belonging to the pools are RAID 1, since the size of the virtual page is half of the size of the real page, the pool capacity (virtual storage storage capacity 2053) is 100 TB.

The real storage storage capacity 2056 is the total value of the storage capacities of the storage devices 160 in the real storage system 100. The pool capacity 2058 is the pool capacity of the real storage system 100. The available storage capacity 2057 is the available capacity of the pool in the real storage system 100. Consequently, the total value of the available storage capacities 2057 of the real storage systems 100 is equal to the total available storage capacity 2055. As with the case of the virtual storage storage capacity 2053, the pool capacity 2058 and the available storage capacity 2057 are represented using values obtained by converting the capacities of the storage devices 160 belonging to the pool into the capacity of the virtual pages.

In this embodiment, the example is described where all the storage devices 160 in each real storage system 100 belong to the pool. Consequently, in the virtual storage system 190 according to this embodiment, the virtual storage storage capacity 2053 is equal to the value obtained by converting the total real storage storage capacity 2054 into the capacity of the virtual pages. The pool capacity 2058 is equal to the value obtained by converting the real storage storage capacity 2056 into the capacity of the virtual pages.

FIG. 8 shows the format of the other real storage system information 2070. The other real storage system information 2070 contains a virtual storage system identifier 2071, other real storage system identifiers 2072, and storage port identifiers 2073. As with the virtual storage system identifier 2051 included in FIG. 7, the virtual storage system identifier 2071 is the identifier of the virtual storage system 190 that contains the real storage system 100. The other real storage system identifier 2072 is the identifier of another real storage system included in the virtual storage system 190 that contains the real storage system 100 concerned. In a case where the virtual storage system 190 includes (n+1) real storage systems 100, the other real storage system information 2070 contains n other real storage system identifiers 2072. In FIG. 8, the other real storage system identifier 2072-$k$ indicates the k-th identifier among other real storage system identifiers 2072. The storage port identifier 2073 is the identifier of the storage port 197 included in the real storage system 100 identified by the other real storage system identifier 2072. The storage port identifier 2073-$k$ indicates the identifier of the storage port 197 included in the real storage system 100 identified by the other real storage system identifier 2072-$k$. In a case where the real storage system 100 includes multiple storage ports 197, multiple other real storage system identifiers 2072-$k$ reside.

Figure 14:
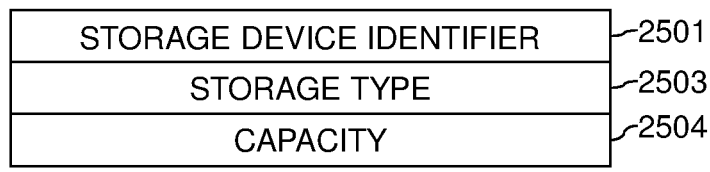
FIG. 14 is a diagram showing a format of storage group information in Embodiment 1.

FIG. 14 shows a format of storage device information 2500. The storage device information 2500 is information for managing the attribute information on the storage device 160, and is created for each storage device 160. Hereinafter, the storage device 160 managed according to certain storage device information 2500 is called "management target storage device". The storage device information 2500 contains a storage device identifier 2501, a storage type 2503, and a capacity 2504.

The storage device identifier 2501 is the identifier of the management target storage device. The storage type 2503 is the type (that is called "device type") of the management target storage device. In this embodiment, the type (device type) of the storage device 160 means the type of the storage medium included in the storage device 160. In the storage type 2503, any of pieces of information on an HDD, a flash storage (SLC), and a flash storage (MLC) is set. In a case where the storage type 2503 is the HDD, the management target storage device is a magnetic disk (HDD). In a case where the storage type 2503 is the flash storage (SLC), the management target storage device is a flash storage adopting an SLC-type flash memory. In a case where the storage type 2503 is the flash storage (MLC), the management target storage device is a flash storage adopting an MLC-type flash memory.

The capacity 2504 is the capacity of the management target storage device. In this embodiment, the storage types and the capacities 2504 of the storage devices 160 belonging to the single storage group 2101 are the same.

FIG. 12 shows a format of storage group information 2300. The storage group information 2300 is information provided for each storage group 2101. Hereinafter, the storage group 2101 managed according to certain storage group information 2300 is called "management target storage group". The storage group information 2300 contains a storage group identifier 2301, a storage group type 2302, a storage device identifier 2303, a group I/O count 2304, the maximum number of I/Os 2305, and an available page management pointer 2200.

The storage group identifier 2301 is the identifier of the management target storage group. In the storage group type 2302, information on the RAID type of the management target storage group, and information on the device type of the storage devices 160 constituting the management target storage group are set. The RAID type information contains not only information representing a data redundancy scheme such as RAID-1 to RAID-6 but also information indicating the number of storage devices 160 constituting the storage group 2101. The storage device identifier 2303 is the identifier of the storage devices 160 constituting the management target storage group. The multiple storage devices 160 belong to the storage group 2101. Accordingly, the storage group information 2300 contains the identifiers of all the storage devices 160 belonging to the storage group 2101.

The group I/O count 2304 is the total number of write requests issued by the storage controller 200 to the management target storage group. Immediately after the management target storage group is defined, the value of the group I/O count 2304 is 0.

The maximum number of I/Os 2305 is the maximum value of the number of write requests that are acceptable by the management target storage group. The maximum number of I/Os 2305 is used in a case where the storage devices 160 belonging to the management target storage group are the storage devices 160 that adopt flash memories as storage media. In a case where the storage devices 160 belonging to the management target storage group are devices having the unlimited number of updatable times, such as HDDs, for example, the maximum number of I/Os 2305 is set to NULL.

The number of updatable times of the storage device 160 is different among the types (storage types 2503) of the storage devices 160. Accordingly, the maximum number of I/Os 2305 is different among the device types of the storage devices 160 constituting the storage group 2101 (as described above, this is information contained in the storage group type 2302).

The available page management pointer 2200 is information for managing the available real pages among the real pages in the management target storage group. The details of the available page management pointer 2200 are described later with reference to FIG. 13.

Figure 9:
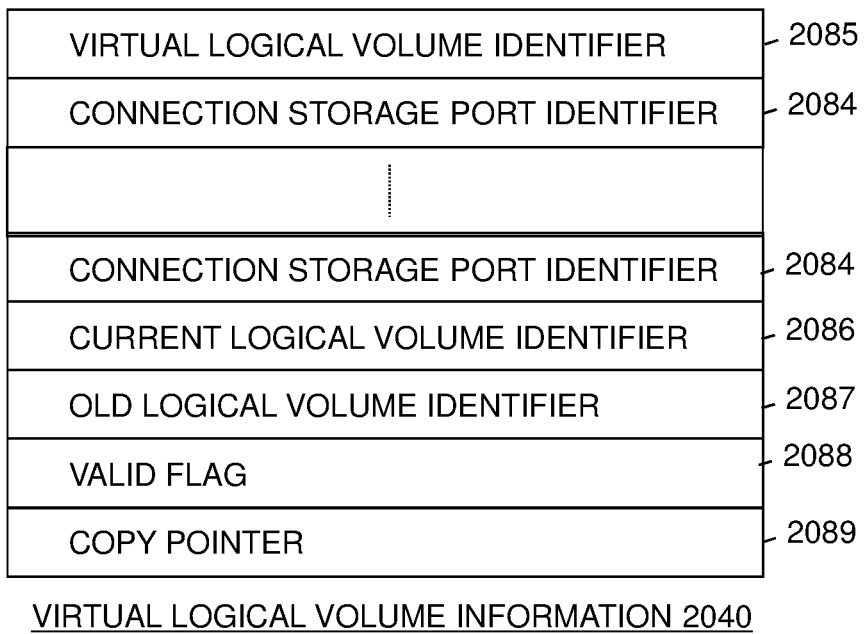
FIG. 9 is a diagram showing a format of virtual logical volume information in Embodiment 1.

FIG. 9 is the format of the virtual logical volume information 2040. The virtual logical volume information 2040 is information for managing the attribute information on the virtual logical volume, and is created for each virtual logical volume. Hereinafter, the virtual logical volume whose attribute information is managed by certain virtual logical volume information 2040 is called "management target virtual logical volume". The virtual logical volume information 2040 contains a virtual logical volume identifier 2085, a connection storage port identifier 2084, a current logical volume identifier 2086, an old logical volume identifier 2087, an valid flag 2088, and a copy pointer 2089.

The virtual logical volume identifier 2085 is the identifier of the management target virtual logical volume. The connection storage port identifier 2084 is the identifier of the storage port 197 to which the management target virtual logical volume is connected. One or more identifiers 2084 reside. The connection storage port identifier 2084 may be the identifier of the storage port 197 of the other real storage system 100.

The current logical volume identifier 2086 is the identifier for identifying the current logical volume mapped to the management target virtual logical volume. The current logical volume identifier 2086 contains not only the logical volume identifier of the current logical volume but also the identifier of the real storage system 100 where the current logical volume is defined, and the identifier of the storage port 197 to which the current logical volume is connected. In a case where the identifier of the real storage system 100 included in the current logical volume identifier 2086 is the same as the identifier of the real storage system 100 where the management target virtual logical volume is defined, it is indicated that the current logical volume is the logical volume defined in the real storage system 100 identical to the real storage system 100 where the management target virtual logical volume is defined.

The old logical volume identifier 2087 is the identifier for identifying the old logical volume mapped to the management target virtual logical volume. In principle, during migration of data from the old logical volume to the current logical volume, the old logical volume identifier 2087 is set to an valid value. Information contained in the old logical volume identifier 2087 is analogous to the current logical volume identifier 2086, and contains not only the logical volume identifier of the old logical volume but also the identifier of the real storage system 100 where the old logical volume is defined, and the identifier of the storage port 197 to which the old logical volume is connected.

The valid flag 2088 is information that indicates the validity of the content of the old logical volume identifier 2087. A case of the valid flag 2088 having a value of 1 (ON) indicates that the content of the old logical volume identifier 2087 is valid and that the data is being migrated from the old logical volume to the current logical volume. A case of the valid flag 2088 having a value 0 (OFF) indicates that the old logical volume identifier 2087 contains no valid information.

The copy pointer 2089 is information that indicates the degree of progress of data migration. When the real storage system 100 according to this embodiment migrates (copies) data from the old logical volume to the current logical volume, copying is performed sequentially from the beginning virtual page of the old logical volume. The copy pointer 2089 contains the virtual page number of the copy target virtual page. The initial value of the copy pointer 2089 is 0. The value is incremented by one every time the virtual page copy process is performed. The copy pointer 2089 may contain information other than the virtual page number. It is only required that the information is information that can identify the copy target virtual page. Consequently, the copy pointer 2089 may adopt the LBA of the logical volume.

Figure 10:
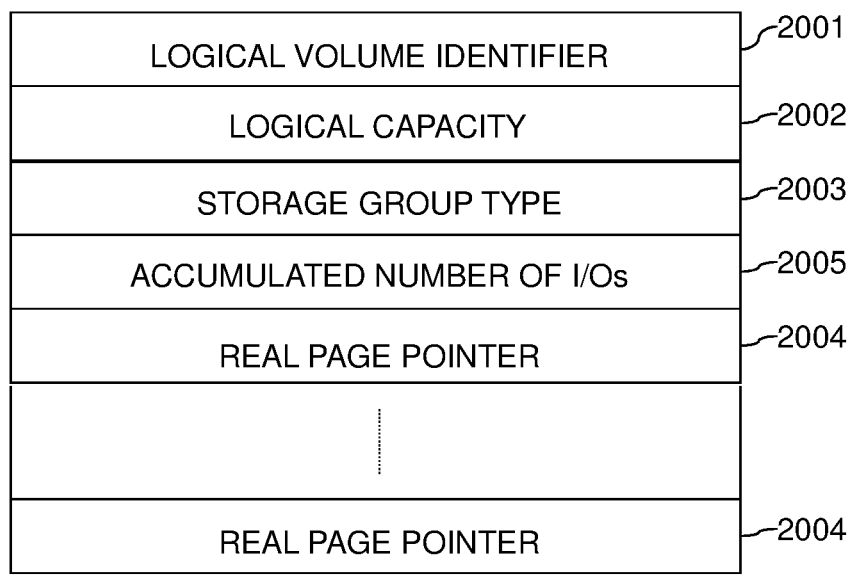
FIG. 10 is a diagram showing a format of logical volume information in Embodiment 1.

FIG. 10 is the format of the logical volume information 2000. The logical volume information 2000 is information for managing the attribute information on the logical volume, and is information that resides for each logical volume. Hereinafter, the logical volume whose attribute information is managed by certain logical volume information 2000 is called "management target logical volume". The logical volume information 2000 contains a logical volume identifier 2001, a logical capacity 2002, a storage group type 2003, a real page pointer 2004, and the accumulated number of I/Os 2005.

The logical volume identifier 2001 is the logical volume identifier of the management target logical volume. The logical capacity 2002 is the capacity of the management target logical volume.

The storage group type 2003 is the attribute (more specifically, the storage group type 2302) of the storage group 2101 to which the real page allocated to (the virtual page of) the management target logical volume belongs. If the storage group type 2003 is set in the management target logical volume, in allocation of the real page to each virtual page in the management target logical volume, the real storage system 100 selects the storage group 2101 where the storage group type 2302 of the storage group 2101 is the same as the storage group type 2003, and allocates the real page in the storage group 2101.

In the real storage system 100 according to this embodiment, the storage group type 2003 is not necessarily set in the logical volume. In a case where the storage group type 2003 is not set in the logical volume (a case where the storage group type 2003 is NULL), the real storage system 100 may allocates the real page in any storage group 2101 when allocating the real page to each virtual page of the management target logical volume. If not otherwise specified, in Embodiment 1, a case is described where no information is set in the storage group type 2003.

The real page pointer 2004 is a pointer to management information (the real page information 2100 described later) about the real page allocated to the virtual page in the management target logical volume. The logical volume information 2000 contains the real page pointers 2004 as many as the virtual pages included in the logical volume (the number of virtual pages included in the logical volume can be obtained by dividing the logical capacity 2002 by the virtual page size). Among the real page pointers 2004 in the logical volume information 2000, the (n+1)-th real page pointer 2004 from the beginning stores the pointer to the real page information 2100 about the real page allocated to the virtual page #n.

Typically, the capacity virtualization shows the storage capacity of the logical volume larger than the capacity of the actual storage medium. Accordingly, in typical cases, the total number of virtual pages in the real storage system 100 is larger than the total number of real pages. In this embodiment, a case is described where the capacity of the virtual page (virtual page size) is common in the real storage system 100. Note that the present invention is effective also in a configuration where virtual pages having different sizes reside in the real storage system 100.

The accumulated number of I/Os 2005 is the number of write requests issued to the management target logical volume. The real storage system 100 adds one to the accumulated number of I/Os 2005 every time the write request is received from the server 110 or the other real storage system 100 to the management target logical volume.

FIG. 11 shows the format of the real page information 2100. The real page information 2100 is the management information about the real page, and exists in each real page. In the following description, the real page managed by certain real page information 2100 is called "management target page". The real page information 2100 contains a storage group identifier 2104, a real page address 2102, an available page pointer 2103, and the accumulated number of page I/Os 2105.

The storage group identifier 2104 is the identifier of the storage group 2101 in which the management target page resides. The real page address 2102 is information indicating the position where the management target page resides. Since the real page resides in the storage group 2101, the information used for the real page address 2102 is the address in the storage group. More specifically, the real page address 2102 contains the address of the beginning area of the management target page. Description is made with reference to FIG. 2. In FIG. 2, for example, the stripe block N is positioned at the beginning of the real page RP1, and the address (storage group address) of the stripe block N is "0x00015000" ("0x" indicates that the numeric value is represented in hexadecimal representation). Consequently, the real page address 2102 of the real page information 2100 on the real page RP1 contains "0x00015000".

In the accumulated number of page I/Os 2105, the number of write requests issued from the outside (the server 110 or the other real storage system 100) to the management target page is recorded. The available page pointer 2103 is information used in a case where the management target page is not allocated to any virtual page (a case of an available page). The available page pointer 2103 to the available page stores the pointer to the real page information 2100 on another available page. As described below, the real storage system 100 according to this embodiment manages the available real pages for each storage group 2101. Accordingly, the available page pointer 2103 stores the pointer to the real page information 2100 on the available page resides in the identical storage group 2101.

Subsequently, the available page management pointer 2200 contained in the storage group information 2300 is described. FIG. 13 shows a set of available real pages managed by the available page management pointer 2200. Hereinafter, the real page information 2100 corresponding to the available real page is sometimes called the available real page information 2100. As shown in FIG. 13, the storage controller 200 connects each available real page information 2100 with the available page pointer 2103, and manages the information as a link list. The storage controller 200 stores the pointer to (address of) the available real page information 2100 at the beginning of the link list into the available page management pointer 2200, thereby managing the available real page(s). The link list is called an available real page information queue. The available real page information queue exists for each storage group 2101.

The available page management pointer 2200 stores the pointer to the beginning available real page information 2100. Thus, the available page management pointer 2200 indicates the real page information 2100 on one available real page in the storage group 2101. Subsequently, the available page pointer 2103 in the available real page information 2100 indicated by the available page management pointer 2200 indicates the next available real page information 2100. In FIG. 13, the available page pointer 2103 on the last available real page information 2100 indicates the available page management pointer 2200. Alternatively, this pointer may have a null (NULL) value. Upon acceptance of a write request for writing to the virtual page to which no real page is allocated, the storage controller 200 searches for the available real page from the available page management pointer 2200 corresponding to any of the storage groups 2101, for example, the storage group 2101 having the largest number of available real pages, and allocates the retrieved page to the virtual page.

The real storage system 100 includes not only the various pieces of management information described above, but also pool management information as information for identifying the storage group 2101 belonging to the pool. Upon acceptance of an instruction for causing the storage group 2101 to belong to the pool from the administrator, the real storage system 100 stores the information (storage group identifier and the like) on the storage group 2101 into the pool management information, thereby defining and managing the pool. The pool management information is information where only information on all the storage groups 2101 belonging to the pool is registered. Consequently, description of the pool management information is omitted.

In the following description, an example is described where when the real storage system 100 allocates the real page to the virtual page, it selects any of the storage groups 2101 in the real storage system 100. This is because, in each real storage system 100 according to this embodiment, all the storage devices 160 (storage groups 2101) are assumed to belong to the pool. In a case where only some storage groups 2101 in the real storage system 100 belong to the pool, when the real storage system 100 allocates the real page to the virtual page, it needs to select the storage group 2101 belonging to the pool with reference to the pool management information and to allocate the real page included in the selected storage group.

Next, an operation executed by the storage controller 200 using the management information described above is described. First, the operation of the storage controller 200 is described. In the storage controller 200, the processor 260 in the storage controller 200 executes the programs, thereby performing processes described later. The programs are stored in the memory 270. As described above, in the following description of each process hereafter, the description is made with the program being sometimes adopted as the subject of a sentence. The description can be understood that the process is executed by the processor 260 or the storage controller 200.

Figure 15:
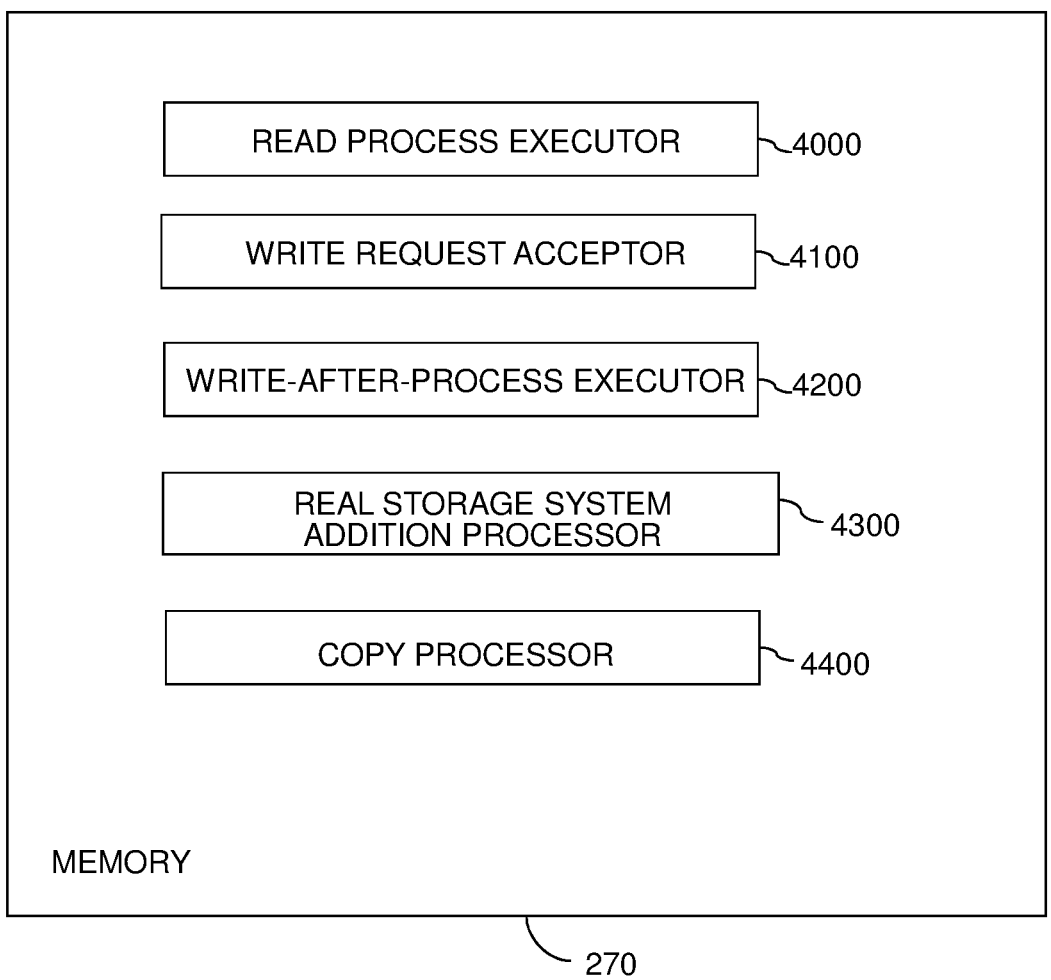
FIG. 15 is a diagram showing programs in a memory of the real storage system according to Embodiment 1.

FIG. 15 shows the programs pertaining to this embodiment stored in the memory 270. The programs pertaining to this embodiment are a read process executor 4000, a write request acceptor 4100, a write-after-process executor 4200, a real storage system addition processor 4300, and a copy processor 4400.

The multiple real storage systems 100 belong to the virtual storage system 190 according to this embodiment. The processing target (for example, the logical volume) of the program executed in a certain real storage system 100 (called, say, "real storage A") can be the logical volume included in the real storage A, or can be the logical volume included in another real storage system 100 in the virtual storage system 190. The process to be executed is different between a case where the processing target of the program executed in the real storage A is in the real storage A and a case where this target is in the other real storage system 100. Consequently, the program may sometimes judge whether the processing target is in the real storage A or not. In the following description of the processing flow of each program, the real storage system 100 where the program is in execution is called "own storage", and the real storage system 100 other than the own storage is called the "other storage".

Figure 16:
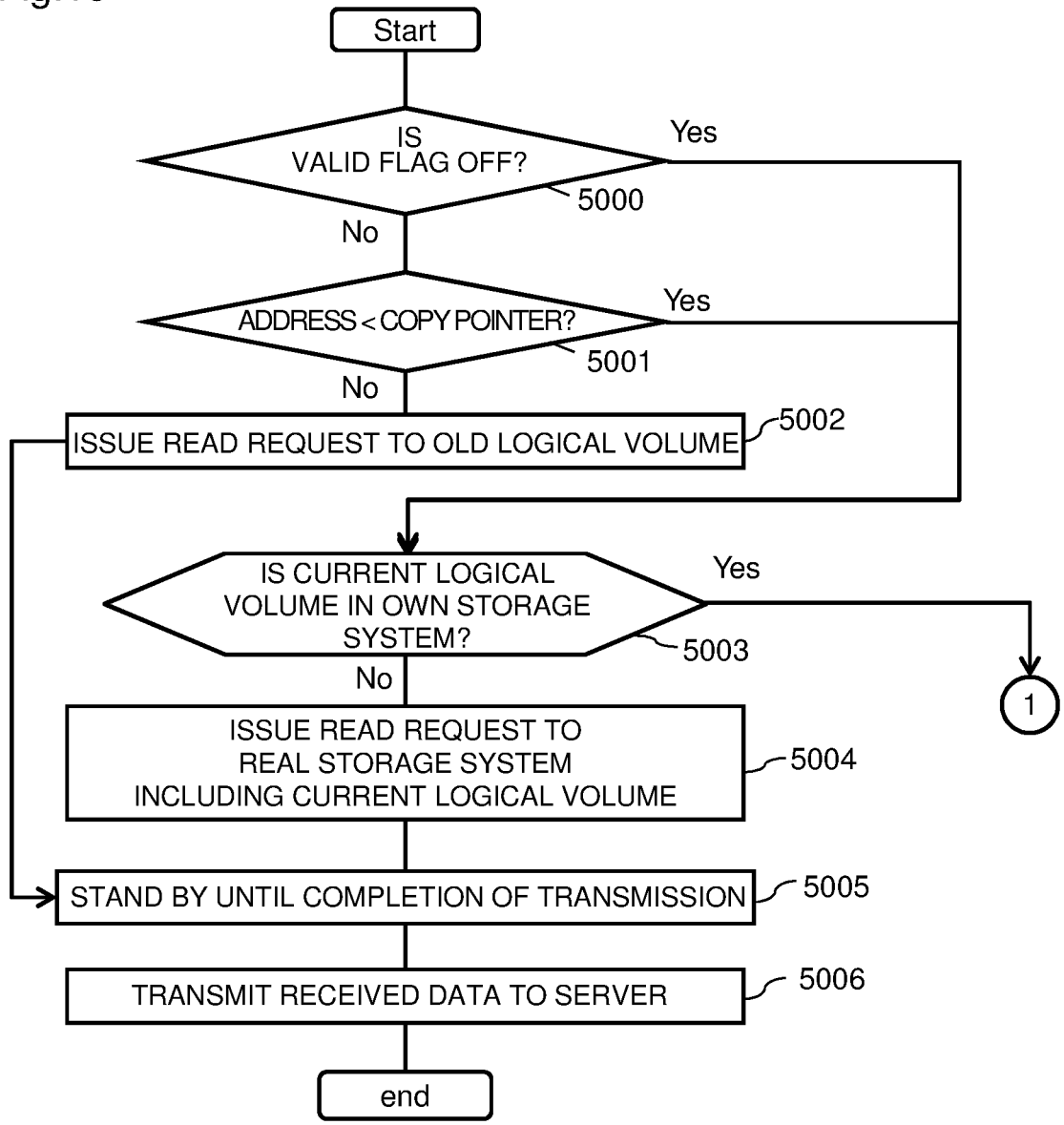
FIG. 16 is a diagram showing a processing flow (1) of a read process executor in Embodiment 1.
Figure 17:
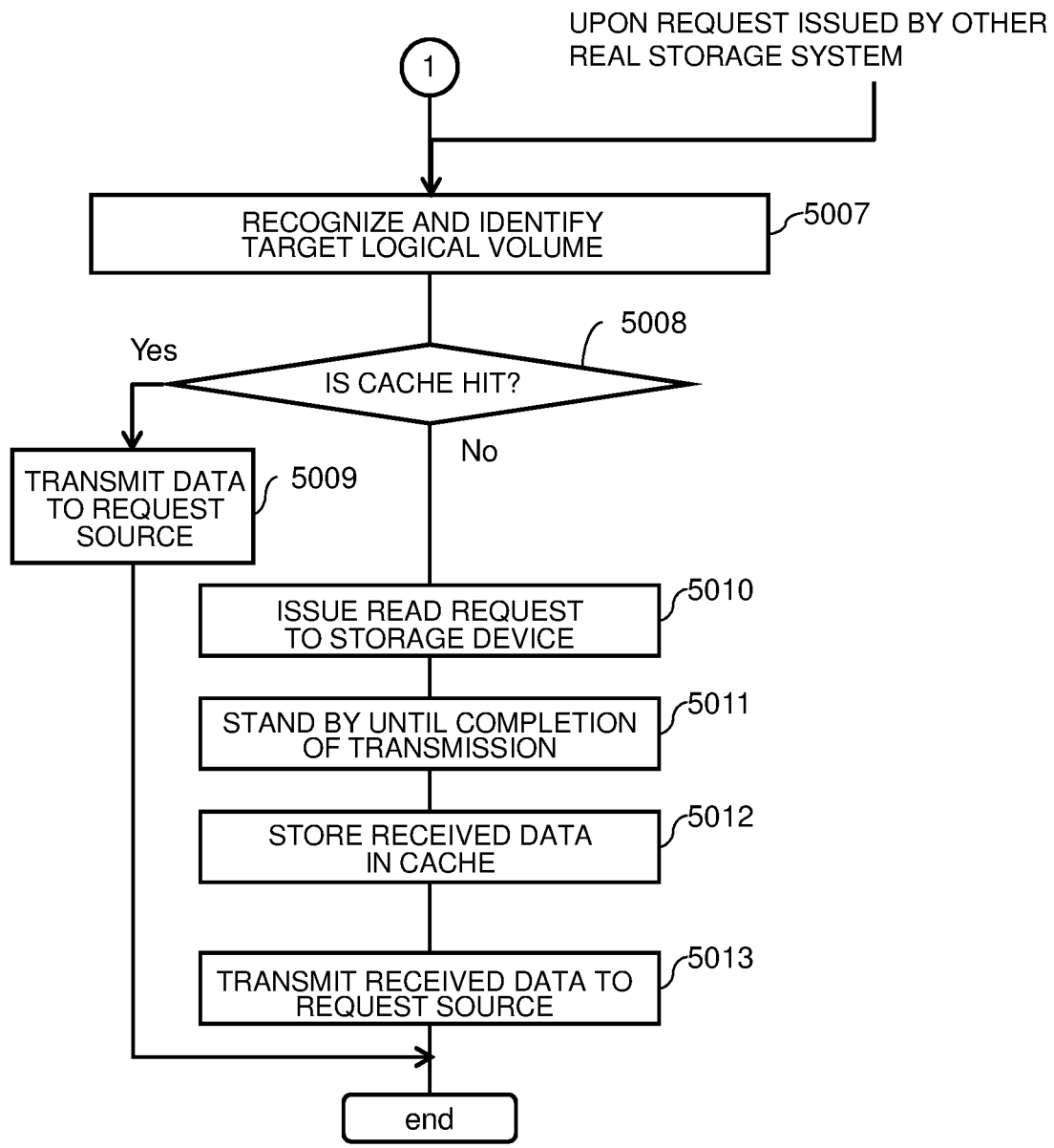
FIG. 17 is a diagram showing a processing flow (2) of the read process executor in Embodiment 1.

FIGS. 16 and 17 are processing flows of the read process executor 4000. The read process executor 4000 is a program that is executed when the own storage accepts a read request issued by the server 110 or accepts a read request issued by the other storage. When the read request issued by the other storage is accepted, the processing is started from step S007 instead of step S000. When the server 110 issues an access request (a read request or a write request), the server 110 includes the virtual logical volume identifier into the access request in order to designate the access target volume. On the other hand, when the real storage system 100 issues an access request to the other real storage system 100, the server 110 includes the logical volume identifier into the access request in order to designate the access target volume.

Step S000: The read process executor 4000 refers to the virtual logical volume information 2040 corresponding to the virtual logical volume designated by the read request received from the server 110, and checks whether the valid flag 2088 is ON. When the valid flag 2088 is OFF (step S000: Yes), the processing jumps to step S003.

Step S001: The read process executor 4000 checks whether the value obtained by converting the designated address into the virtual page number is larger than the copy pointer 2089. When the value obtained by converting the designated address into the virtual page number is larger than the copy pointer 2089, step S002 is subsequently performed. When the value is smaller, step S002 is skipped and then step S003 is performed.

Step S002: The read process executor 4000 issues a read request to the real storage system 100 that includes the logical volume identified by the old logical volume identifier 2087 (that is, the old logical volume). The old logical volume identifier 2087 contains the logical volume identifier, and the identifier of the storage port 197 to which the logical volume is connected. The read process executor 4000 issues the read request to the storage port 197 of the real storage system 100 including the old logical volume, using these pieces of information. Subsequently, step S005 is performed.

Step S003: The read process executor 4000 refers to the current logical volume identifier 2086 to check whether the access target logical volume is the logical volume included in the own storage. If it is affirmative, the processing jumps to step S007.

Step S004: The read process executor 4000 issues a read request that designates the logical volume to the real storage system 100 that includes the logical volume designated by the current logical volume identifier 2086.

Step S005: The read process executor 4000 stands by until data is transmitted from the real storage system 100 that is the read request issuance destination.

Step S006: The read process executor 4000 transmits the transmitted data to the server 110, and completes the processing.

Step S007: The read process executor 4000 adopts, as the processing target, the logical volume indicated by the current logical volume identifier 2086 or the identifier of the logical volume designated by the other storage. (When the read request issued by the other real storage system 100 is accepted, the execution is started from this step.)

Step S008: The read process executor 4000 checks whether the data at the address designated by the read request resides in the cache 210. When the data does not reside in the cache 210, step S010 is subsequently performed. When the data resides in the cache 210, step S009 is subsequently performed.

Step S009: The read process executor 4000 transmits the data residing in the cache 210 to the server 110 or the other storage having issued the request. Subsequently, the processing is completed.

Step S010: In this case, the read process executor 4000 recognizes the corresponding logical volume information 2000 on the basis of the identifier of the designated logical volume. Furthermore, the read process executor 4000 refers to the real page pointer 2004 of the virtual page that contains the address designated by the read request, thereby obtaining the real page information 2100 on the real page allocated to the virtual page.

For example, when the virtual page number is n as a result of conversion of the address designated by the read request into the virtual page number, the read process executor 4000 refers to the (n+1)-th real page pointer 2004 in the logical volume information 2000 to thereby obtain the real page information 2100. The read process executor 4000 then refers to the real page information 2100 to thereby recognize the corresponding storage group information 2300 and to identify the storage device(s) 160 and its address(es) including the requested data on the basis of the RAID type and the like. The read process executor 4000 then issues a read request to the storage device(s) 160 that stores the read target data.

Step S011: The read process executor 4000 stands by until the request is completed and the read data is returned.

Step S012 and step S013: The read process executor 4000 stores the transmitted data in the cache 210 (step S012). Furthermore, the read process executor 4000 transmits the data to the server 110 or the other storage having issued the request (step S013) and completes the processing.

Figure 18:
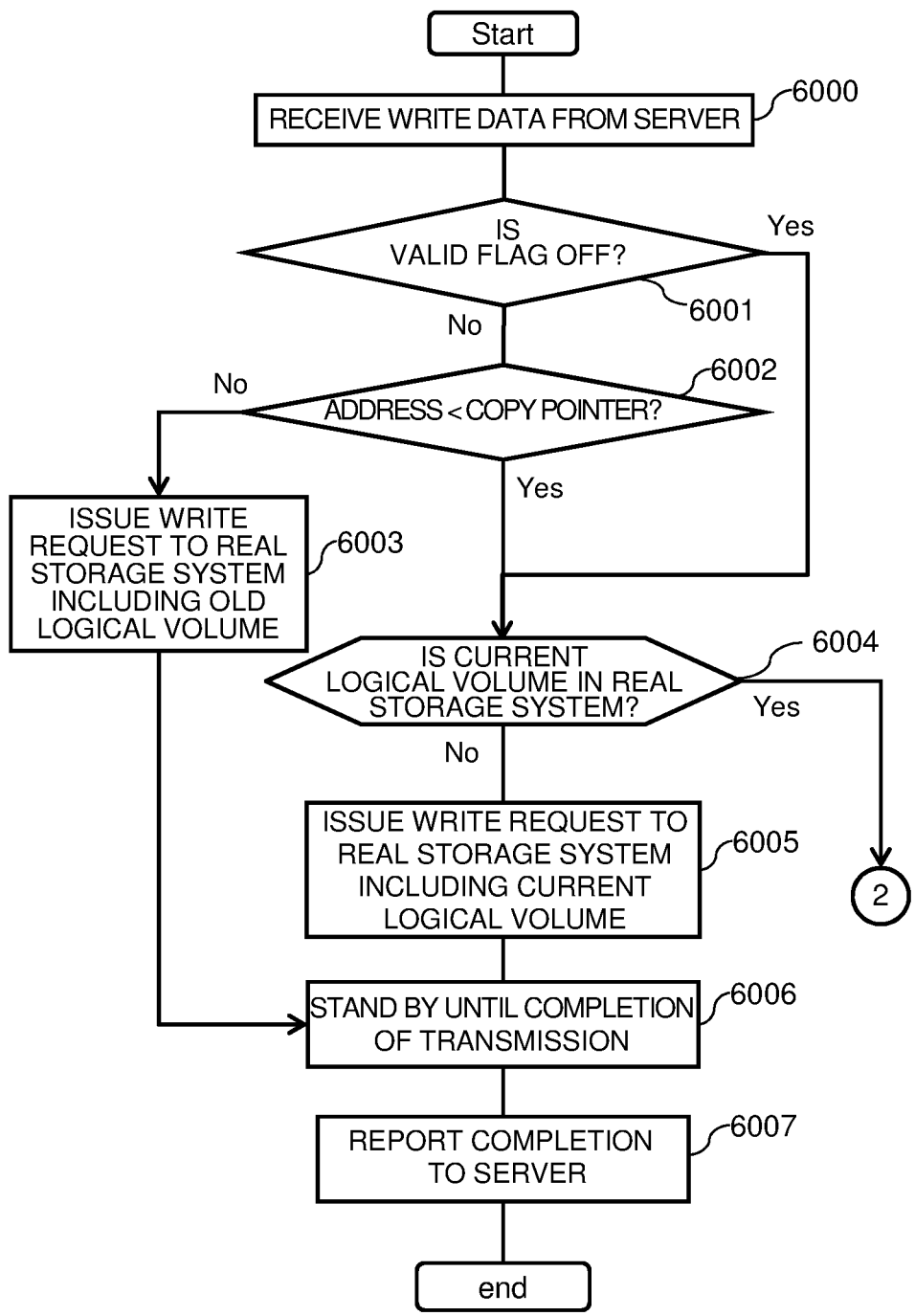
FIG. 18 is a diagram showing a processing flow (1) of a write request acceptor in Embodiment 1.
Figure 19:
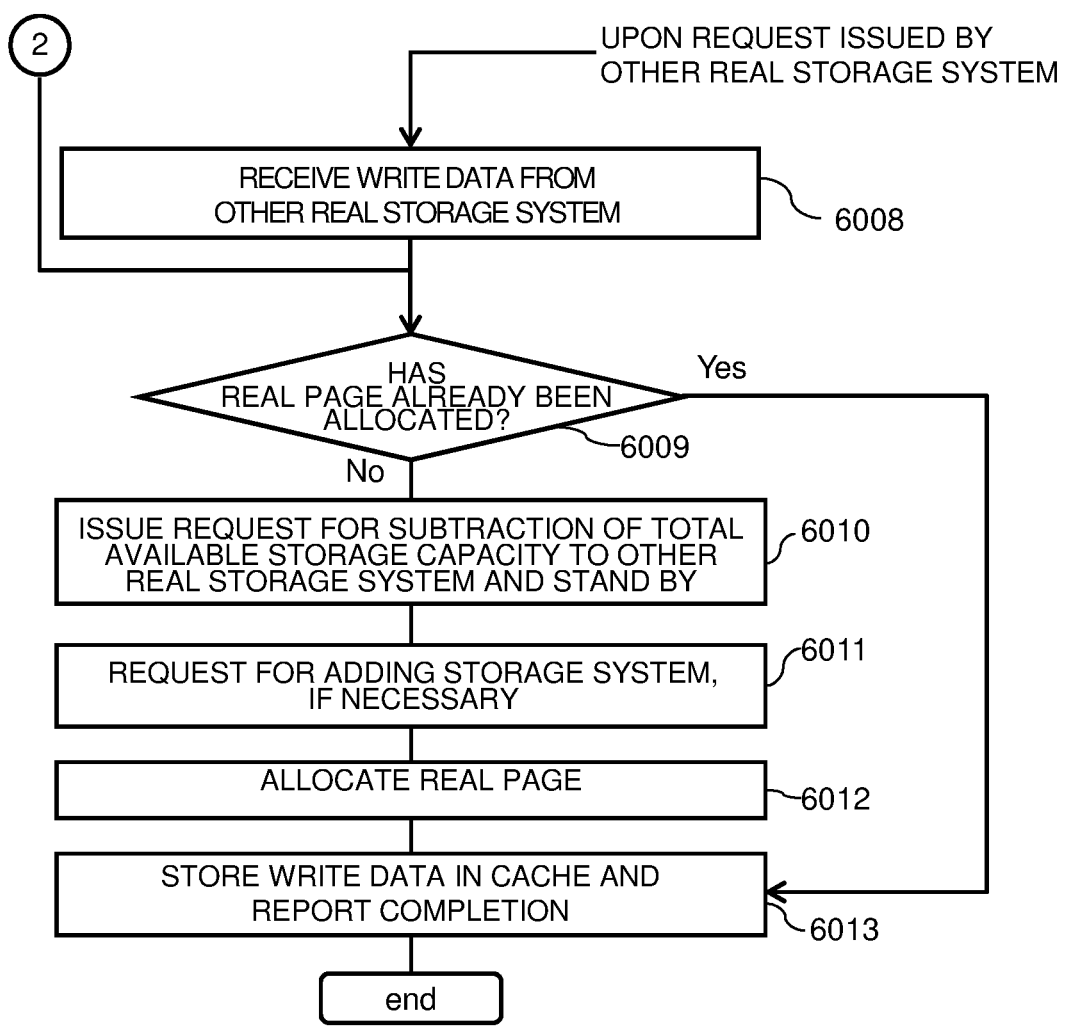
FIG. 19 is a diagram showing a processing flow (2) of the write request acceptor in Embodiment 1.

FIGS. 18 and 19 are the processing flows of the write request acceptor 4100. The write request acceptor 4100 is executed when the storage controller 200 accepts the write request from the server 110 or from the other storage. When the write request issued by the other storage is accepted, the processing is started from step 6008 instead of step 6000.

Step 6000: The write request acceptor 4100 (processor 260) receives the write request and write data from the server 110.

Step 6001: The write request acceptor 4100 refers to the virtual logical volume information 2040 corresponding to the virtual logical volume designated by the received write request, and checks whether the valid flag 2088 is ON. When the valid flag 2088 is OFF (step 6001: Yes), step 6002 and step 6003 are skipped.

Step 6002: The write request acceptor 4100 checks whether the address designated by the received write request is larger than the copy pointer 2089. When the designated address is smaller than the copy pointer 2089 (step 6002: Yes), step 6004 is subsequently performed.

Step 6003: When the address designated by the write request is equal to or larger than the copy pointer 2089 (step 6002: No), step 6003 is executed. In step 6003, the write request acceptor 4100 issues the write request to the real storage system 100 that includes the old logical volume, and transmits the write data. The old logical volume identifier 2087 contains the logical volume identifier, and the identifier of the storage port 197 to which the logical volume is connected. The write request acceptor 4100 issues the write request to (the storage port 197 of) the real storage system 100 that includes the logical volume identified by the old logical volume identifier 2087 (old logical volume), using these pieces of information. Subsequently, the write request acceptor 4100 skips step 6004 and step 6005, and executes step 6006.

Step 6004: The write request acceptor 4100 refers to the current logical volume identifier 2086 to check whether the write target logical volume is the logical volume included in the own storage. If it is affirmative, the processing jumps to step 6008.

Step 6005: The write request acceptor 4100 issues a write request and transmits the write data, to the real storage system 100 (other storage) that includes the logical volume designated by the current logical volume identifier 2086. The other storage having received the write request executes the write request acceptor 4100, and at this time, the processing is started from step 6008.

Step 6006: The write request acceptor 4100 waits for return of notification of write request completion from the real storage system 100 that is the issuance destination of the write request.

Step 6007: The write request acceptor 4100 reports completion to the server 110, and completes the processing.

Step 6008: The write request acceptor 4100 receives the write request and write data from the other storage. (When the write request issued by the other storage is received, the execution is started from this step.)

Step 6009: The write request acceptor 4100 judges whether the real page is allocated to the virtual page corresponding to the address designated by the write request. This judgement can be made by converting the address designated by the write request into the virtual page number and by referring to the real page pointer 2004 of the logical volume information 2000 on the basis of the virtual page number. For example, when the virtual page number is n as a result of conversion of the address designated by the write request into the virtual page number, it is preferred that the write request acceptor 4100 refer to the (n+1)-th real page pointer 2004 in the logical volume information 2000 and judge whether the real page pointer 2004 stores a valid value. When the real page is allocated, step 6013 is subsequently performed. When the real page is not allocated, step 6010 is subsequently performed.

Step 6010: The write request acceptor 4100 subtracts the virtual page capacity from the total available storage capacity 2055 and the available storage capacity 2057. The write request acceptor 4100 issues a request for subtracting the total available storage capacity 2055 to the other storages, and stands by until the completion of the request. (The other storages having received this request subtract the virtual page capacity from the total available storage capacity 2055, and subsequently report the completion to the real storage system 100 that is the request issuance source. The processing flow is omitted since only such a process is done.)

Step 6011: The write request acceptor 4100 checks the total available storage capacity 2055 and the available storage capacity 2057, and issues a request for adding a new real storage system 100 to the storage management server 180, if necessary. For example, when the total available storage capacity 2055 or the available storage capacity 2057 is less than a predetermined threshold, it is preferred that the request for adding the new real storage system 100 be issued. When a maintenance staffer recognizes the information notified to the storage management server 180 and the addition of the real storage system 100 is requested to the vendor, the real storage system 100 is added to the information system.

Step 6012: The write request acceptor 4100 selects an appropriate piece of the storage group information 2300, selects one piece of real page information 2100 from the available page management pointer 2200, and allocates the selected page to the virtual page. If the write target virtual page number here is n, the write request acceptor 4100 registers the pointer to the real page information 2100 on the secured real page, in the (n+1)-th real page pointer 2004 from the beginning, among the real page pointers 2004 in the logical volume information 2000 on the write target logical volume.

Step 6013: The write request acceptor 4100 stores the received data in the cache 210. The write request acceptor 4100 adds one to the accumulated number of I/Os 2005 in the logical volume information 2000 on the write target logical volume, and adds one to the accumulated number of page I/Os 2105 in the real page information 2100 on the write target real page. Subsequently, the write request acceptor 4100 reports the completion to the server 110 in the case of the write request received from the server 110, and reports the completion to the other storage in the case of the write request received from the other storage.

The example where the one is added to the accumulated number of I/Os 2005 and the accumulated number of page I/Os 2105 has herein been described. Alternatively, a value larger than one may be added to the accumulated number of I/Os 2005 and the accumulated number of page I/Os 2105 according to the amount of write data. For example, in a case where the write data size is the size of n stripe blocks, the write request acceptor 4100 may add n to the accumulated number of I/Os 2005 and the accumulated number of page I/Os 2105.

When the write request acceptor 4100 stores data in the cache 210, this acceptor adds information pertaining to the data to the data and then stores the data. More specifically, the information pertaining to the data is information that can identify the storage device 160 serving as the data write destination and the address in the storage device 160. The data stored in the cache 210 by the write request acceptor 4100 is required to be written in the storage device 160 at a certain stage. The process is performed by the write-after-process executor 4200 described later.

When the write-after-process executor 4200 writes the data into the storage device 160, the data write destination storage device 160 is required to be identified. When the data is written into the storage group 2101, update of the parity (redundant data) of RAID is also required. Consequently, the write-after-process executor 4200 is required to identify the storage device 160 that is the write destination of the redundant data. For this purpose, the write request acceptor 4100 adds information pertaining to the data.

The information pertaining to the data is, for example, the identifiers of the storage devices 160 that are the data (and redundant data) storage destination, and the addresses in the storage devices 160. Alternatively, other information may be adopted. For example, if the identifier of the data write destination logical volume and the address (LBA) of the logical volume are added to the data, the storage devices 160 that are the data (and redundant data) write destination and the addresses in the storage devices 160 can be derived from these pieces of information. For this purpose, the logical volume identifier and the LBA of the logical volume may be added. In this embodiment, the description is made assuming that, as to the information pertaining to the data, the data write destination logical volume identifier and LBA are added to the data.

The information pertaining to the data may be stored in the cache 210 together with the data. Alternatively, the information may be stored in the shared memory 220.

Figure 20:
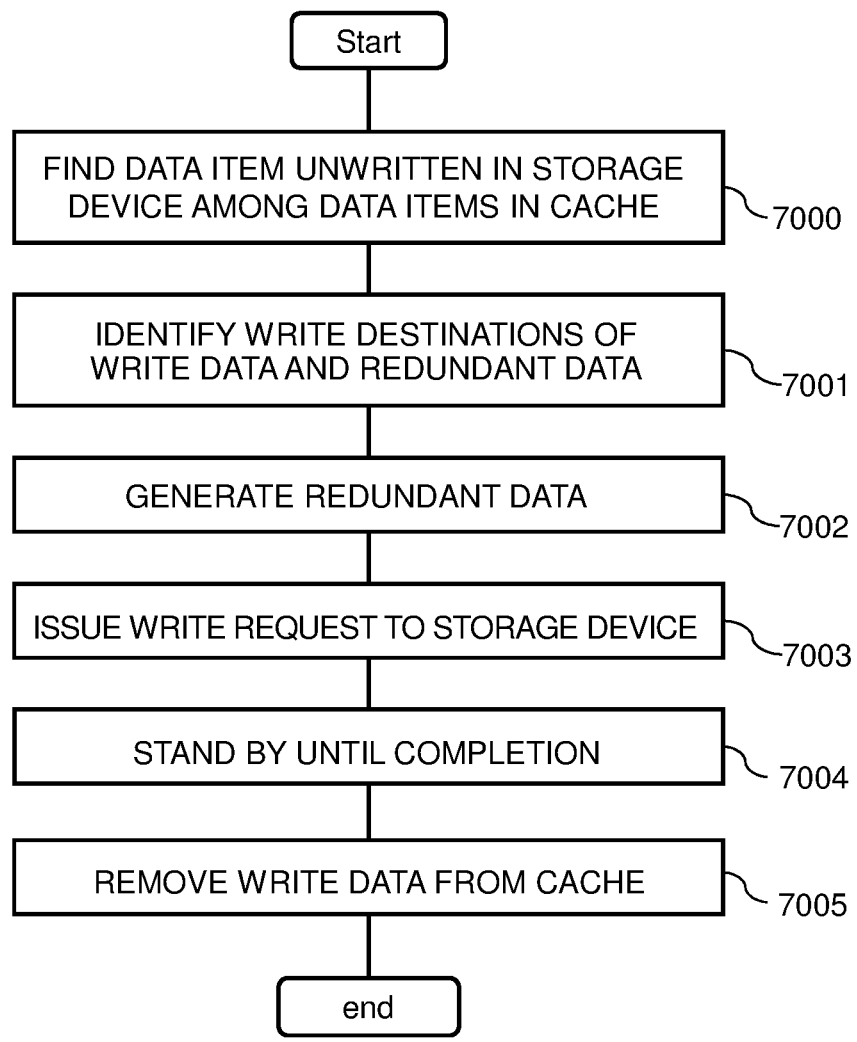
FIG. 20 is a diagram showing a processing flow of a write-after-process executor in Embodiment 1.

FIG. 20 is a processing flow of the write-after-process executor 4200. The write-after-process executor 4200 is a process appropriately executed by the processor 260.

Step 7000: The write-after-process executor 4200 judges whether write data having not been written in the storage device 160 yet (hereinafter called "dirty data") resides in the cache 210. When the dirty data items reside, the write-after-process executor 4200 selects one of the items. When no dirty data item resides in the cache 210, the write-after-process executor 4200 terminates the processing without executing the processes in and after step 7001.

Step 7001: The write-after-process executor 4200 identifies the storage group 2101 that is the write destination of the dirty data and the redundant data on the dirty data, and the storage devices 160 and their addresses of the write destination, on the basis of the information added to the dirty data (information pertaining to the data). Furthermore, the write-after-process executor 4200 adds one to the group I/O count 2304 in the storage group information 2300 of the identified storage group 2101. In another embodiment, the amount of a value to be added to the group I/O count 2304 may be changed according to the size of the data to be written into the storage device 160. For example, in a case where the data having the size of n stripe blocks is written into the storage device 160, n may be added to the group I/O count 2304.

Step 7002: The write-after-process executor 4200 generates the redundant data on the dirty data selected in step 7000. To generate the redundant data, the write-after-process executor 4200 is required to read data from the storage device(s) 160 in the storage group 2101 in some cases. This is a publicly known technique. Consequently, the description thereof is omitted.

Step 7003: The write-after-process executor 4200 issues a write request to each of the storage device 160 into which dirty data is to be written and the storage device 160 into which the redundant data is to be written. (These are different storage devices.)

Step 7004: The write-after-process executor 4200 stands by until a response of completion of the write process is returned from the storage devices 160.

Step 7005: After the response of completion of the write process is returned from the storage devices 160, the write-after-process executor 4200 removes the dirty data in the cache 210. Alternatively, it causes the dirty data to be in a state showing that the dirty data has already been written in the storage device 160. Subsequently, the processing is completed.

FIG. 21 is the processing flow of the real storage system addition processor 4300. In the following description, the real storage system 100 added to the virtual storage system 190 is called "own storage", and the virtual storage system 190 to which the own storage is added is called "addition target virtual storage".

In the real storage system 100 (own storage) added to the addition target virtual storage, the storage group 2101 has already been defined, and the storage device information 2500 and the storage group information 2300 have already been defined. Beside these pieces, the virtual storage system identifier 2051, the real storage system identifier 2052, the real storage storage capacity 2056, the available storage capacity 2057, and the pool capacity 2058 have preliminarily been set in the own storage. More specifically, the identifier of the addition target virtual storage has preliminarily been set in the virtual storage system identifier 2051. The real storage storage capacity 2056 is set to the total value of the capacities of the storage devices 160 in the real storage system 100, and the pool capacity 2058 and the available storage capacity 2057 are set to the pool capacity.

The own storage recognizes the real storage systems 100 with the same virtual storage system identifier 2051, through communication with each real storage system 100 immediately after connection to the SAN 120 (immediately before execution of step 8001). When the own storage is required to issue notification to each real storage system 100 belonging to the same virtual storage system 190, the own storage notifies each real storage system 100 that was recognized here.

Among the steps described in FIG. 21, step 8001 to step 8007 are processes executed by the real storage system addition processor 4300 of the own storage. Step 8011 to step 8022 are processes executed by the real storage system addition processor 4300 of the real storage system 100 notified by the own storage (hereinafter this is called "real storage A" to be discriminated from the own storage). However, in the following description, to prevent the description from being diffuse, the subject of the processes in step 8001 to step 8007 is represented as "own storage", and the subject of the processes in step 8011 to step 8022 is represented as "real storage A".

Step 8001: The own storage notifies each real storage system 100 in the addition target virtual storage, of information indicating that the real storage system 100 is added to the virtual storage system 190, of the real storage storage capacity 2056 and pool capacity 2058 of the own storage, of the real storage system identifier 2052 of the own storage, and of the storage port identifier of the storage port 197 included in the own storage.

Step 8002: The own storage stands by until the response is returned from each real storage system 100.

On the other hand, the real storage system 100 (real storage A) notified by the added real storage system 100 determines that some virtual logical volumes will be migrated to the added real storage system 100 (however, in some cases, it is determined that the virtual logical volume will not be migrated). The real storage A then transmits information on the virtual storage storage capacity 2053, the total real storage storage capacity 2054 and the total available storage capacity 2055, the identifier of the virtual logical volume determined to be migrated, the identifier (current logical volume identifier 2086), the logical capacity 2002 and the storage group type 2003 of the logical volume mapped to the virtual logical volume, and the identifier of the storage port 197 connected to the virtual logical volume, to the added real storage system 100 (step 8016). The process performed by the real storage A is described later.

Step 8003: The own storage sets the information received from the real storage A (information on the virtual storage storage capacity 2053, the total real storage storage capacity 2054 and the total available storage capacity 2055), in the storage system information 2050. Also the own storage defines one or more virtual logical volumes which are determined to be migrated. More specifically, the own storage creates the virtual logical volume information 2040 on the virtual logical volume, and sets the identifier of the virtual logical volume designated as the migration target by the real storage A, and the identifier of the logical volume (current logical volume identifier 2086) mapped to the virtual logical volume, in the virtual logical volume identifier 2085 and the old logical volume identifier 2087 of the created virtual logical volume information 2040, respectively. Furthermore, the own storage sets the received storage port identifier, in the connection storage port identifier 2084 of the virtual logical volume information 2040.

The own storage defines (creates) the logical volume (current logical volume) to be mapped to the virtual logical volume designated as the migration target. More specifically, the own storage newly creates the logical volume information 2000. Furthermore, the real storage system addition processor 4300 determines the identifier of the logical volume, and stores the determined logical volume identifier in the logical volume identifier 2001 of the logical volume information 2000. The logical volume identifier determined here may be any identifier only if the identifier is other than the identifiers of the logical volumes residing in the own storage.

The own storage stores information on the storage capacity and the storage group type that have been received from the other real storage system 100, in the logical capacity 2002 and the storage group type 2003, respectively. In a case where the storage group type 2003 is not set in the logical volume designated as the migration target, the own storage does not necessarily set the storage group type 2003 of the current logical volume defined here.

The own storage sets the identifier of the created logical volume, the identifier of the own storage and the identifier of the storage port 197 of the own storage, in the current logical volume identifier 2086 of the virtual logical volume information 2040 created this time, sets the valid flag 2088 to 1 (ON), and sets the copy pointer 2089 to an initial value (0). The own storage determines the storage port 197 that can be used when the server 110 accesses the virtual logical volume, and stores the identifier of the determined storage port 197 in the virtual logical volume information 2040. Note that multiple storage ports 197 may be usable.

Step 8004: The own storage notifies the server 110 of the virtual storage system identifier 2051 included in the own storage, of the virtual logical volume identifier(s) 2085 of the virtual logical volume(s) defined in step 8003, and of the storage port identifier(s) of the storage port(s) 197 usable for access to the virtual logical volume(s). The server 110 recognizes that the virtual logical volume(s) is/are connected to the notified storage port(s) 197 through this notification, and stores information on the storage system identifier and the storage port identifier(s) in the server port information 198.

Step 8005: The own storage notifies completion of information setting to the other real storage system(s) 100 including one or more sets of virtual logical volumes designated as the migration target. Furthermore, the own storage may notify the other real storage system(s) 100 of the current logical volume identifier(s) 2086, of the identifier of the storage port(s) 197 accessible to the current logical volume(s), and of the identifier(s) of the virtual logical volume(s).

Step 8006: The own storage stands by until responses are returned from the respective other real storage systems 100.

Step 8007: Upon receipt of the responses from all the real storage systems 100 to which the notification has been transmitted in step 8005, the own storage activates the copy process (starts execution of the copy processor 4400) for each virtual logical volume to be migrated. Subsequently, the processing is finished.

Subsequently, processes executed by the real storage system 100 other than the real storage system 100 added to the virtual storage system 190, in particular, the real storage system 100 (real storage A) having received a request from the added real storage system 100 are described.

First, processes executed when the real storage A receives at the first time a request issued by the added real storage system 100 (step 8001) are described (step 8011 to step 8016). The real storage A adds the pool capacity 2058 received from the added real storage system 100 to the virtual storage storage capacity 2053 and the total available storage capacity 2055, and adds the real storage storage capacity 2056 received from the added real storage system 100 to the total real storage storage capacity 2054 (step 8011). The real storage A notifies the server 110 of the addition of the real storage system 100, and of information on the virtual storage storage capacity 2053, total real storage storage capacity 2054 and total available storage capacity 2055 (step 8012). It is desirable that the notification to the server 110 be made by any one of the real storage systems 100. Alternatively, multiple real storage systems 100 may notify the same capacity.

In step 8013, the real storage A compares the pool capacity 2058 and the available storage capacity 2057 of the storage A with each other, and when the real storage A determines that the pool available capacity of this real storage A is insufficient (for example, when the available storage capacity 2057 becomes a predetermined value or less, when "the available storage capacity 2057/the pool capacity 2058 becomes a predetermined value or less, or the like), the real storage A determines to migrate one or more virtual logical volumes to the added real storage system 100 (step 8014). When the pool available capacity of the real storage A is not insufficient (step 8013: No), step 8014 is skipped.

The virtual logical volume determined here to be migrated is called "migration target virtual logical volume". Furthermore, the logical volume mapped to the migration target virtual logical volume is also the target of migration. The logical volume mapped to the migration target virtual logical volume is called "migration target logical volume".

Any method may be used for determining the number of migration target (virtual) logical volumes and the logical capacities in step 8014. It is preferable to determine the logical capacities (or the number) of logical volumes to be migrated in consideration of the number of real storage systems 100 constituting the virtual storage system 190 and the storage capacity of the added real storage system 100. For example, when the storage capacity of the added real storage system 100 (total real storage storage capacity 2054) is relatively large (equal to or more than a predetermined threshold), it is preferred that the real storage A increase the migration target virtual logical volumes. When the number of real storage systems 100 constituting the virtual storage system 190 is large, the other real storage systems 100 also migrate the logical volumes to the added real storage system 100. Consequently, it is not preferable that many migration target virtual logical volumes exist.

Further, when the real storage A selects one or more migration target (virtual) logical volumes in step 8014, this real storage A may select any (virtual) logical volume(s). Alternatively, in another embodiment, the real storage A may select the (virtual) logical volume(s) on the basis of a certain determination criteria. An example of the method of selecting the migration target (virtual) logical volume is described in a variation example described later.

In step 8015, the real storage A adds the real storage system identifier of the added real storage system 100, and the storage port identifier(s) of the storage port(s) 197 included in the added real storage system 100, to the other real storage system information 2070.

Subsequently, in step 8016, the real storage A transmits the identifier of the migration target virtual logical volume, the identifier of the migration target logical volume (correctly, the current logical volume identifier 2086 recorded in the virtual logical volume information 2040 of the migration target logical volume), the capacity of the migration target logical volume, and the identifier of the storage port 197 connected to the migration target logical volume (except the identifier of the storage port 197 of the real storage A), to the added real storage system 100. In a case where multiple migration target virtual logical volumes reside, the information is transmitted with respect to each migration target virtual logical volume. In a case with no migration target virtual logical volume, a NULL value is transmitted.

Subsequently, processes executed by the real storage A (steps 8021 to 8022) when the real storage A receives a second request issued by the added real storage system 100 (step 8005) are described. Here, the real storage A notifies the server 110 to which the migration target virtual logical volume is connected, of the identifier of the migration target virtual logical volume, and of the storage port identifier 24003 of the storage port 197 included in the real storage A, and issues a request for removing the notified storage port identifier 24003 among the storage port identifiers 24003 associated with the migration target virtual logical volume (step 8021). Upon receipt of this request, the server 110 removes the storage port identifier 24003 of the designated virtual logical volume from the server port information 198.

Furthermore, the real storage A erases the virtual logical volume information 2040 on the migration target virtual logical volume (step 8022). Upon receipt of the virtual logical volume identifier, the logical volume identifier and the storage port identifier from the real storage system 100 added to the virtual storage system 190, the real storage A sets the logical volume identifier in the current logical volume identifier 2086 of the virtual logical volume information 2040 associated with the virtual logical volume identifier, and sets the storage port identifier in the connection storage port identifier 2084. Subsequently, after notification of completion of the processing to the added real storage system 100, the real storage system addition processor 4300 of the real storage A finishes the processing.

Figure 22:
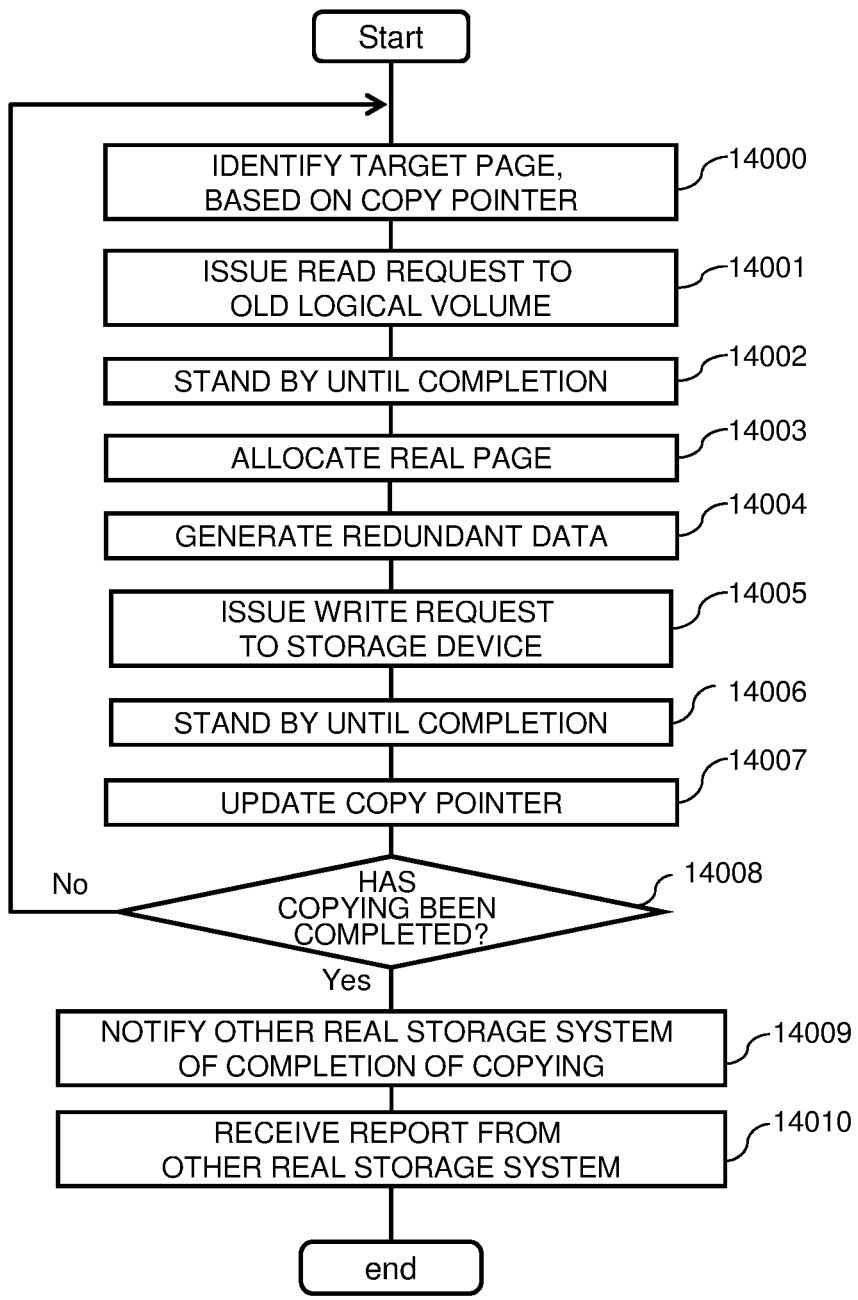
FIG. 22 is a diagram showing a processing flow (1) of a copy processor in Embodiment 1.
Figure 23:
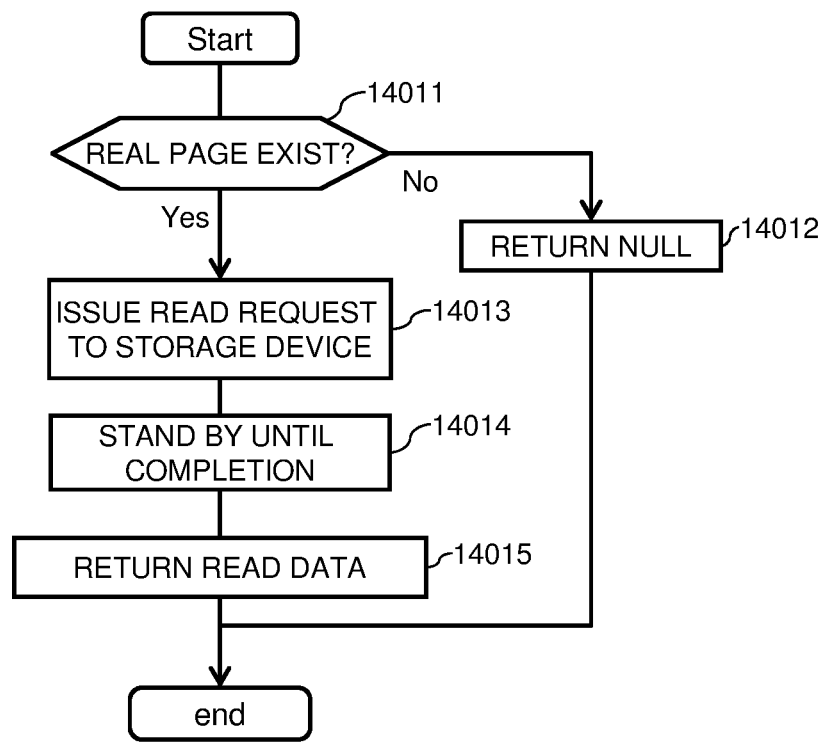
FIG. 23 is a diagram showing a processing flow (2) of the copy processor in Embodiment 1.

FIGS. 22 and 23 are processing flows of the copy processor 4400. The copy processor 4400 is a program for performing a process of migrating (copying) data from the old logical volume mapped to the virtual logical volume to the current logical volume. The copy processor 4400 starts execution when an instruction of activation is issued by the real storage system addition processor 4300 (step 8007). This process is executed for each virtual logical volume. The copy processes of multiple virtual logical volumes may be executed in parallel. In the following description, the virtual logical volume that is the target of the data migration process is called a migration target virtual logical volume.

Processes in step 14000 to step 14010 are processes executed by the copy processor 4400 of the real storage system 100 newly added to the virtual storage system 190. In the following description, to prevent the description from being diffuse, the description is made with the subject of the processes being simply represented as "copy processor 4400".

Step 14000: The copy processor 4400 identifies the address (virtual page number) indicated by the copy pointer 2089 of the migration target virtual logical volume. The virtual page in the old logical volume and the virtual page in the current logical volume that are identified by the virtual page number identified here are determined as copy process targets. The copy processor 4400 executes the copy process for each virtual page.

The copy processor 4400 reads data subsequently from the beginning virtual page in the old logical volume, and copies the data to the virtual page in the current logical volume. In the description of the following step 14001 to 14006, an example is described where the copy processor 4400 performs the process for the virtual page #n. In the following description, the virtual page #n may sometimes be represented as "VP #n".

Step 14001: The copy processor 4400 identifies the identifier of the real storage system 100 including the old logical volume, and the logical volume identifier of the old logical volume, on the basis of the old logical volume identifier 2087 of the virtual logical volume information 2040 corresponding to the migration target virtual logical volume, and determines the address designated in the read request on the basis of the copy pointer 2089. The copy processor 4400 issues the read request to the identified real storage system 100 by designating the logical volume identifier of the identified logical volume and the address of the read target virtual page.

Step 14002: The copy processor 4400 stands by until data is transmitted from the real storage system 100 having issued the read request, and executes step 14003 upon transmission of the data. In some cases, a NULL value may be transmitted from the real storage system 100 having issued the read request. In such cases, the copy processor 4400 subsequently executes step 14007.

Step 14003: Here, the real page to be allocated to the VP #n of the current logical volume is secured. The copy processor 4400 appropriately selects the storage group 2101 in the real storage system 100, refers to the available real page information 2100 on this storage group, and secures the available real page. This processor then registers the pointer to the real page information 2100 on the secured real page, in the (n+1)-th real page pointer 2004 from the beginning among the real page pointers 2004 in the logical volume information 2000 in the current logical volume. Furthermore, the copy processor 4400 subtracts the virtual page size from the available storage capacity 2057. The storage group 2101 selected here may be any group. Alternatively, the storage group 2101 may be selected according to any selection criteria.

Step 14004: The copy processor 4400 generates the redundant data from the transmitted data.

Step 14005: The copy processor 4400 issues a write request in order to write the received data and the redundant data into the storage devices 160 where the real page secured in step 14003 reside. The real page is an area defined across the multiple storage devices 160 belonging to the storage group 2101. Accordingly, the write requests are issued to the multiple storage devices 160 here.

Step 14006: The copy processor 4400 stands by until a report of completion of the write process is returned from each storage device 160.

Step 14007: The copy processor 4400 adds one to the copy pointer 2089.

Step 14008: The copy processor 4400 compares the copy pointer 2089 with the number of virtual pages in the logical volume to thereby check whether copying has been completed. In a case of being not completed, that is, in a case where the copy pointer 2089 is equal to or less than the number of virtual pages in the logical volume (step 14008: No), the copy processor 4400 performs the processing again from step 14000. In a case where the copying has been completed, that is, in a case where the copy pointer 2089 exceeds the number of virtual pages in the logical volume (step 14008: Yes), step 14009 is subsequently performed.

Step 14009: The copy processor 4400 stores 0 (OFF) in the valid flag 2088 of the virtual logical volume, and transmits a notification of completion of the copying, and the logical volume identifier of the old logical volume, to the real storage system 100 including the old logical volume identified by the old logical volume identifier 2087.

Step 14010: Upon receipt of the completion report from the real storage system 100 including the old logical volume, the copy processor 4400 finishes the processing.

FIG. 23 shows a processing flow executed by the copy processor 4400 of the real storage system 100 whose the logical volume is migrated to the added real storage system 100, that is, the real storage system 100 including the old logical volume.

Processes in steps 14011 to 14015 are executed when the real storage system 100 including the old logical volume receives the read request (the request issued in step 14001) issued by the added real storage system 100. Hereinafter, if not otherwise specified, the processes described on steps 14011 to 14015 are processes executed by the copy processor 4400 of the real storage system 100 including the old logical volume.

Step 14011: The copy processor 4400 refers to the real page pointer 2004 of the logical volume information 2000 to thereby judge whether the real page is allocated to the designated virtual page. In a case where the real page is allocated, step 14013 is subsequently performed.

Step 14012: In a case where no real page is allocated, the copy processor 4400 returns a NULL value to the request source real storage system 100 and completes the processing.

Step 14013: The copy processor 4400 recognizes the storage group 2101 (in turn, the storage devices 160 constituting the storage group 2101) where the real page resides, and issues read requests for reading data (data on virtual pages) to the recognized storage devices 160. Though the real page contains not only the read target data but also the redundant data corresponding to the read target data, the copy processor 4400 is not required to read the redundant data here.

Step 14014: The copy processor 4400 stands by until the data reading from the storage device 160 is completed.

Step 14015: The copy processor 4400 transmits the read data on the virtual page to the request source real storage system 100. Furthermore, the size of one virtual page is added to the own available storage capacity 2057 (of the real storage system 100 including the old logical volume). The processing in the case where the real storage system 100 including the old logical volume has received the read request is thus finished.

Subsequently, processes performed by the copy processor 4400 of the real storage system 100 including the old logical volume when completion of copying is reported by the added real storage system 100 (step 14009) are described (illustration in diagrams is omitted). From the added real storage system 100, the logical volume identifier is transmitted together with the copy completion report. Consequently, the copy processor 4400 removes the logical volume identified by the received logical volume identifier. More specifically, it is preferred that the logical volume information 2000 be removed. At this time, the copy processor 4400 also performs a process of moving the real page information 2100 on the real page allocated to the removal target logical volume to the available real page information queue. Subsequently, a completion report is issued to the added real storage system 100.

Embodiment 1 has thus been described. The virtual storage system according to Embodiment 1 includes the multiple real storage systems. The real storage system defines the logical volume, and defines the virtual logical volume associated with the logical volume and provides the virtual logical volume for the server. The real storage system where the virtual logical volume is defined is not necessarily the same as the real storage system where the logical volume associated with the virtual logical volume is defined. Consequently, when an available area is in any real storage system in the virtual storage system, the user (administrator) can use the area.

In the virtual storage system according to Embodiment 1, the real storage system manages the own pool capacity and pool available capacity, and furthermore, the real storage system calculates the total of the pool capacities and the total of the pool available capacities of the real storage systems included in the virtual storage system, and provides the server with these totals as the pool capacity and the pool available capacity of the virtual storage system. Consequently, the user (administrator) is not required to monitor the capacities (or available capacities) of the pool in each of the (real) storage systems, and is only required to monitor the capacity of single storage system (virtual storage system) instead.

Variation Example

Subsequently, a variation example of the virtual storage system according to Embodiment 1 is described. In the virtual storage system according to Embodiment 1, when the real storage system is added to the virtual storage system, some logical volumes in the real storage system belonging to the virtual storage system so far are migrated to the added real storage. This is for the sake of securing the pool available capacity in each real storage system. In the variation example described below, an example of logical volume migration for the sake not only of securing the pool available capacity but also of achieving long service lives of storage devices is described.

In the variation example, the hardware configurations and various pieces of management information on the virtual storage system and the real storage system are not different from those described in Embodiment 1. Accordingly, illustration in diagrams is omitted. Hereinafter, issues different from those described in Embodiment 1 are mainly described. Programs executed by the real storage system in the variation example are almost identical to the programs described in Embodiment 1. However, an internal wear leveling unit 4500 and a system wear-leveling unit 4600 (not shown) are added to the variation example. Further, the processes in the write request acceptor 4100 and the real storage system addition processor 4300 are slightly different from those described in Embodiment 1.

First, the point in the process in the write request acceptor 4100 according to the variation example different from that described in Embodiment 1 is described. In the real storage system according to the variation example, the type of real page to be allocated to each logical volume is restricted. When the real storage system 100 according to the variation example allocates the real page to each virtual page in the logical volume (for example, when step 6012 in the write request acceptor 4100 is executed), it selects the storage group 2101 where the storage group type 2302 of the storage group 2101 is the same as the storage group type 2003 of the logical volume. Hereinafter, the storage group 2101 selected here is called "candidate group". In the real storage system 100 according to the variation example, it is thus assumed that a valid value is set in the storage group type 2003 in the logical volume information 2000 of each logical volume.

The real storage system 100 then selects the available real page from the candidate group, and allocates the available real page to the virtual page. When the real storage system 100 selects the available real page from the candidate group, this system selects, with a priority, the available real page included in the candidate group having a long remaining service life.

In this example, the example is described where when the candidate group is selected, the storage group where the storage group type 2302 of the storage group 2101 is the same as the storage group type 2003 of the logical volume is selected as described above. Alternatively, in another embodiment, the storage group 2101 simply having the same device type may be selected as the candidate group. For example, in a case where the device type set in the storage group type 2003 of the logical volume is "flash storage (SLC)" or "flash storage (MLC)", the real storage system 100 may adopt a method of selecting the storage group 2101 including the flash storage (any of SLC and MLC) as the candidate group.

The method of determining the remaining service life in the variation example is described. As widely known, the flash memory has a certain limit on the number of erase times. The memory cannot be used after the number of erase times reaches the limit. Here, the number of erase times of the flash memory reaching a predetermined limit is called "reaching the service time". A state where the number of erase times of the flash memory becomes a value close to the limit is called a state where "the remaining service life is short".

In the variation example that will be described later, the real storage A determines the length of remaining service life of the storage group 2101 using the number of writes instead of the number of erase times of the storage group 2101 including the flash storages. There is a correlation between the number of erase times and the number of writes (rewrites) of the flash memory. Consequently, the service life can thus be estimated using the number of writes.

More specifically, in determination of the service life of the storage group 2101, the real storage system 100 refers to the storage group information 2300 on the storage group 2101 to thereby calculate "the group I/O count 2304/the maximum number of I/Os 2305". Hereinafter, "the group I/O count 2304/the maximum number of I/Os 2305" is called "degree of update". The lower the degree of update is, the longer the remaining service life of the storage group 2101 is. Inversely, the higher the degree of update is, the shorter the remaining service life of the storage group 2101 is.

For example, when step 6012 in the write request acceptor 4100 is executed, the real storage system 100 selects the storage group 2101 having the lowest degree of update from among the candidate groups having available real pages, and selects the available real page included in the selected storage group 2101. Consequently, the available real page of the storage group 2101 having the longest remaining service life can be allocated to the virtual page.

The reason of calculating the degree of update (the group I/O count 2304/the maximum number of I/Os 2305) instead of the group I/O count 2304 (that is, the number of writes) is that determining the service life simply based on the number of writes is inappropriate because the flash storage rewritable number of times (or the erasable number of times) is different depending on the device type.

Subsequently, the process in the internal wear leveling unit 4500 is described. The internal wear leveling unit 4500 is a program for migrating data among the storage devices 160 in the real storage system 100 to cause the numbers of rewrites (the number of erase times) of the storage devices 160 to be equal to each other as much as possible. The storage device 160 that is the target of the data migration process is the storage device 160 that includes flash memories as storage media, that is, the storage device 160 having restriction on the number of rewrites.

The storage device 160 including flash memories as storage media (flash storage) also executes what is called a wear leveling process inside the storage device 160 to cause the number of rewrites (or the numbers of erase times) of each of the flash memories in the storage device 160 to be equal to each other. Since this is a publicly known process, the description thereof is omitted.

Hereinafter, the overview of the process in the internal wear leveling unit 4500 is described. The internal wear leveling unit 4500 is periodically executed. The internal wear leveling unit 4500 refers to the storage group information 2300 on the storage groups 2101 in the real storage system 100 to thereby calculate the degree of update of each storage group 2101. Furthermore, the internal wear leveling unit 4500 calculates the average value of the degrees of update of all the storage groups 2101 in the real storage system 100.

When the difference between the degree of update of a certain storage group 2101 (hereinafter called "target group") and the calculated average value of degrees of update exceeds a predetermined value, the internal wear leveling unit 4500 identifies the real page allocated to the virtual page in the logical volume among the real pages belonging to the storage group 2101. The internal wear leveling unit 4500 can identify the real pages by selecting pieces of logical volume information 2000 in which the storage group type 2003 is the same as the storage group type 2302 of the target group, among every logical volume information 2000, and referring to the storage group identifier 2104 of the real page information 2100 indicated by the real page pointer 2004 of the selected logical volume information 2000.

The internal wear leveling unit 4500 then identifies the real page having the largest accumulated number of page I/Os 2105 among the identified real pages (this real page is called "migration source real page"). Then the data on the migration source real page is migrated to the available real page (this is called "migration destination real page") belonging to the storage group 2101 having the lowest degree of update, and the real page pointer of the logical volume information 2000 is changed so as to allocate the migration destination real page to the virtual page to which the migration source real page has been allocated.

The method of selecting the migration target data executed by the internal wear leveling unit 4500 is not limited to the method described above. Various methods can be adopted only if the data is migrated so that the disequilibrium of the numbers of rewrites (the number of erase times) among the storage devices 160 or the storage groups 2101 can be canceled as much as possible.

Subsequently, the processing details of the real storage system addition processor 4300 in the variation example are described. Note that the details of the processes (step 8001 to step 8007 in FIG. 21) executed by the real storage system addition processor 4300 of the real storage system 100 added to the virtual storage system 190 are the same as those described in Embodiment 1. Consequently, the description is omitted here.

On the other hand, the processes (in and after step 8011 in FIG. 21) executed by the real storage system 100 (in the following description, this is called "real storage A" as with Embodiment 1) having received the request issued by the added real storage system 100 are slightly different from those described in Embodiment 1. In Embodiment 1, when the real storage A migrates the virtual logical volume to the added real storage system 100, the real storage A may migrate any virtual logical volume. On the other hand, in the variation example, when there is a storage group 2101 having a short remaining service life, the real storage system addition processor 4300 of the real storage A migrates, with a priority, the virtual logical volume to which the real page of this storage group 2101 is allocated, to the added real storage system 100.

The details of the processes in and after step 8011 in the variation example are described. Among step 8011 to step 8022, the processes other than step 8014 are the same as the processes described in Embodiment 1. Consequently, the details executed in step 8014 are hereinafter described. The following processes are processes executed by the real storage system addition processor 4300 of the real storage A. However, to prevent the description from being diffuse, the following description is made with the real storage A being represented as the subject of the processes.

When the pool available capacity of the real storage A is insufficient (step 8013: Yes), step 8014 is executed. In step 8014, first, the real storage A determines the capacity of the migration target virtual logical volume. This process is the same process described in Embodiment 1. That is, it is preferred that the capacity of the migration target virtual logical volume be determined in consideration of the number of real storage systems 100 constituting the virtual storage system 190, or the storage capacity of the added real storage system 100. The capacity of the migration target virtual logical volume determined here is hereinafter called "amount of migration".

Subsequently, the real storage A judges whether the storage group 2101 having "the group I/O count 2304/the maximum number of I/Os 2305" (degree of update) exceeding a prescribed threshold (for example, a predetermined value, such as 0.9) resides. In the variation example, the real storage system 100 regards the storage group 2101 having the degree of update exceeding the prescribed threshold as the storage group 2101 having a short remaining service life. However, the storage group 2101 where the maximum number of I/Os 2305 is not set, for example, the storage group 2101 having an unlimited the number of rewrites, such as HDD, is regarded not to be the determination target.

When no storage group 2101 having a short remaining service life resides, the real storage A selects any virtual logical volume as a migration target virtual logical volume, as described in Embodiment 1.

When a storage group 2101 having a short remaining service life resides, the real storage A extracts the logical volume(s) whose storage group type 2003 is identical to the storage group type 2302 of this storage group 2101. Furthermore, the real storage A refers to the real page information 2100 on the real pages allocated to the extracted logical volumes to thereby identify the logical volume to which the real page in the storage group 2101 having a short remaining service life is allocated. If multiple such logical volumes reside, the real storage A selects the migration target logical volumes from among the identified logical volumes until reaching the amount of migration. At the same time, the real storage A selects the virtual logical volume with which the migration target logical volume is associated, as the migration target virtual logical volume. The processes thereafter are the same as those described in Embodiment 1. That is, the real storage A notifies the added real storage system 100 (own storage) of the identifier of the migration target virtual logical volume, the identifier of the migration target logical volume and the like (step 8016). On the other hand, the own storage executes step 8003 to step 8007 to thereby perform a process of migrating the data in the migration target logical volume notified from the real storage A to the logical volume defined in the own storage.

When the real storage A selects the migration target logical volume, the real storage A performs the selection with a priority from the logical volume to which the most real pages of the storage groups 2101 having short remaining service lives are allocated. Thus, the number of rewrites of the storage group 2101 having a short remaining service life is expected to be reduced, thereby allowing the service life of the storage group 2101 having a short remaining service life to be extended.

The example where the determination in step 8013 is performed, that is, the example where the (virtual) logical volume is migrated when the pool available capacity of the real storage A is insufficient, has been described above. Alternatively, in another embodiment, the determination in step 8013 is not necessarily performed. That is, when the storage group 2101 having the degree of update exceeding the prescribed threshold resides even if the pool available capacity of the real storage A is not insufficient, it can be determined that the real storage A migrates the (virtual) logical volume.

In another embodiment, instead of the selection with a priority on the logical volume to which many real pages of the storage groups 2101 having short remaining service lives are allocated in the case where the real storage A selects the migration target logical volume from among the logical volumes having the same storage group type as the storage group 2101 having a short remaining service life has, the real storage A may select, with a priority, the logical volume having the largest accumulated number of I/Os 2005.

Migration of the logical volume having the largest accumulated number of I/Os 2005 to the other real storage system 100 reduces the total number of writes to each storage group 2101 in the real storage A. In the real storage A, the internal wear leveling unit 4500 is periodically executed. Consequently, the numbers of rewrites to the storage groups 2101 becomes substantially even. Accordingly, the number of rewrites to the storage group 2101 having a short remaining service life is expected to be reduced. As a result, the service life of the storage group 2101 can be extended.

Subsequently, the process in the system wear-leveling unit 4600 is described. The system wear-leveling unit 4600 is periodically executed by each real storage system 100. The system wear-leveling unit 4600 controls each storage group 2101 so that the numbers of writes of the storage groups 2101 included in each real storage system 100 in the virtual storage system 190 can become the same, thereby preventing the service lives of the storage groups 2101 in a specific real storage system 100 from being shortened.

More specifically, when the degrees of update of the storage groups 2101 included in each real storage system 100 become uneven, the real storage system 100 including a storage group 2101 having a high degree of update (hereinafter this is called "real storage A") migrates the (virtual) logical volume to the real storage system 100 including the storage group 2101 having a low degree of update (hereinafter called "real storage B").

Referring to FIG. 30, the flow of the system wear-leveling unit 4600 is described. In the following description, if not otherwise specified, step 9001 to step 9007 are processes executed by the system wear-leveling unit 4600 of the real storage A, that is, processes of migrating the (virtual) logical volume to the real storage system 100 other than the real storage A. Step 9011 to step 9017 are processes executed by the system wear-leveling unit 4600 of the real storage B.

Step 9001: The real storage A issues a request for transmitting the service life information and the available capacity to each real storage system 100 in the virtual storage system 190, and obtains the service life information and the pool available capacity from each real storage system 100. The service life information is the average value of the degrees of update of the storage groups 2101 (the group I/O count 2304/the maximum number of I/Os 2305).

Each of the real storage systems 100 (including the real storage B) having received the request calculates the degree of update for each storage group 2101 in the real storage system 100 and further obtains the average value of the calculated values (service life information). For the storage groups 2101 whose maximum numbers of I/Os 2305 are NULL, each real storage system 100 does not calculate the degree of update. Each real storage system 100 returns the obtained average value (service life information) and the available storage capacity 2057 to the real storage A (step 9011).

Step 9002: The real storage A obtains the service life information on the storage groups 2101 included in the real storage A. More specifically, the real storage A calculates "the group I/O count 2304/the maximum number of I/Os 2305" for each storage group 2101 in the real storage A, and further obtains the average value of the calculated values (hereinafter, the average value is represented as "a"). The real storage A further calculates the average value of the pieces of service life information obtained from each real storage system 100 in the virtual storage system 190 (hereinafter, the average value is represented as "b").

A case where (a-b) is equal to or higher than a predetermined value (step 9002: Yes) means that unevenness occurs between the (average of) remaining service lives of the storage group 2101 included in the real storage A and the (average of) remaining service lives of the storage groups 2101 included in the other real storage system 100, and that the (average of) remaining service lives of the storage groups 2101 included in the real storage A (is) are short. In this case, the real storage A determines to migrate some virtual logical volumes in the real storage A, and performs the processes in and after step 9003. On the contrary, in a case where (a-b) is less than the predetermined value (step 9002: No), the processing is finished.

Step 9003: Here, first, the real storage A determines the real storage system 100 that is the migration destination of the logical volumes (and the virtual logical volumes to which the logical volumes are mapped) included in the real storage A. The real storage A refers to the service life information obtained from each real storage system 100, and determines the real storage system 100 having the shortest service life information as the migration destination of the logical volume. Hereinafter, the real storage system 100 determined as the migration target of the logical volume is called the real storage B.

Subsequently, the real storage A determines the amount of logical volumes) that are to be migrated, on the basis of the available storage capacity 2057 received from the real storage B. The amount determined here is called "amount of migration". However, if the logical volumes having the same amount as the available storage capacity 2057 has are migrated to the real storage B, the storage area of the real storage B is depleted. Consequently, it is preferred that the real storage A determine, for example, an amount equivalent to x % of the available storage capacity 2057 as the amount of migration (x is a relatively small value, such as 10).

Furthermore, the real storage A determines the logical volume (and the virtual logical volume) to which the real page of the storage group 2101 having the highest degree of update among the storage groups 2101 included in the real storage A is allocated, as the migration target. When multiple logical volumes satisfy the condition and the total of the logical capacities of these logical volumes exceeds the amount of migration, the real storage A selects the logical volumes as the migration target logical volume with a priority on the logical volume to which the most real pages of the storage group 2101 having the highest degree of update are allocated.

In some cases, only one logical volume that can be a migration target (the logical volume to which the real page of the storage group 2101 having the highest degree of update is allocated) resides but the logical capacity of the logical volume exceeds the amount of migration. In such cases, the logical volume cannot be migrated. In next step 9004, this determination is performed.

Step 9004: As described above, the real storage A judges whether the logical volume selected in 9003 can be migrated to the real storage B. When the selected logical volume cannot be migrated to the real storage B (step 9004: No), the processing is finished. When migration can be made, step 9005 is subsequently performed.

Step 9005: The real storage A transmits information on the migration target logical volume (and the virtual logical volume) to the real storage B. This process is analogous to the process in step 8016. The real storage A stands by until the response is returned from the real storage B.

Step 9006: Here, the real storage A performs a process analogous to that in step 8021 described in Embodiment 1, that is, the process that notifies the server 110 to which the migration target virtual logical volume is connected, of the storage port identifier 24003 of the storage port 197 included in the real storage A, and makes the server 110 remove the information on the notified storage port identifier 24003 from the server port information 198.

Step 9007: Here, the real storage A performs a process analogous to that in step 8022 described in Embodiment 1, and finishes the processing.

Subsequently, the processes performed in the real storage B are described. As described above, in step 9011, each of the real storage systems 100 (also including the real storage B) having received, from the real storage A, a request for transmitting the service life information and the available capacity calculates the average value of degrees of update of all the storage groups 2101 including flash storages among the storage groups 2101 in the real storage system 100, and returns the calculated average value and the available storage capacity 2057 to the real storage A. Subsequently, the real storage B stands by until the information is transmitted from the real storage A.

Step 9012: The real storage B receives the information transmitted by the real storage A in step 9005, and defines the virtual logical volume and the current logical volume. The process in step 9012 is subsequently identical to step 8003 described in Embodiment 1. However, in step 9012, information on the virtual storage storage capacity 2053, the total real storage storage capacity 2054, and the total available storage capacity 2055 is not set. This is because the capacity (pool capacity and the like) does not increase here.

Step 9013: The real storage B causes the server 110 to perform the same process as step 8004 described in Embodiment 1, that is, the process of setting information in the server port information 198.

Step 9014: The real storage B notifies the real storage A of completion of defining the migration target virtual logical volume and setting the information in the server 110. This process is a process analogous to that in step 8005 described in Embodiment 1. After step 9014 is performed, the real storage A performs step 9006.

Step 9015: When the notification on completion of the process is returned from the real storage A (step 9007), the real storage B starts a process of copying the migration target virtual logical volume. This process is a process analogous to that in step 8007. After the copy process, the process of the system wear-leveling unit 4600 in the real storage B is finished.

The variation example has thus been described. In adding the real storage system, the virtual storage system according to the variation example migrates the logical volume to which the real page in the storage group having a large degree of update is allocated (and the virtual logical volume with which the logical volume is associated) to the added real storage system. This system migrates the (virtual) logical volume between the real storages so as to equalize the degrees of update in the storage groups in the virtual storage system. Such migration facilitates achievement of a long service life of each storage device.

In the example described above, the necessity of migration of the (virtual) logical volume is determined and the migration target (virtual) logical volume is selected, on the basis of the number of writes of the storage group (group I/O count 2304) counted by the real storage system. In another embodiment, in a case where the storage device 160 has a function of internally counting the number of erase times of the flash memory and notifying the storage controller of the number of erase times, the real storage system may use the number of erase times obtained from the storage device 160 instead of the number of writes (group I/O count 2304) to select the migration target logical volume.

Embodiment 2

Subsequently, Embodiment 2 is described. The hardware configuration of an information system in Embodiment 2 is analogous to that of the information system in Embodiment 1. Consequently, the illustration with the diagrams is omitted.

One difference between Embodiment 2 and Embodiment 1 is that the virtual storage system 190 according to Embodiment 2 may allocate the real pages of multiple real storage systems 100 to one logical volume. Information defined in the shared memory 220 in Embodiment 2 is substantially analogous to that described in Embodiment 1, but is different in the following points.

Figure 24:
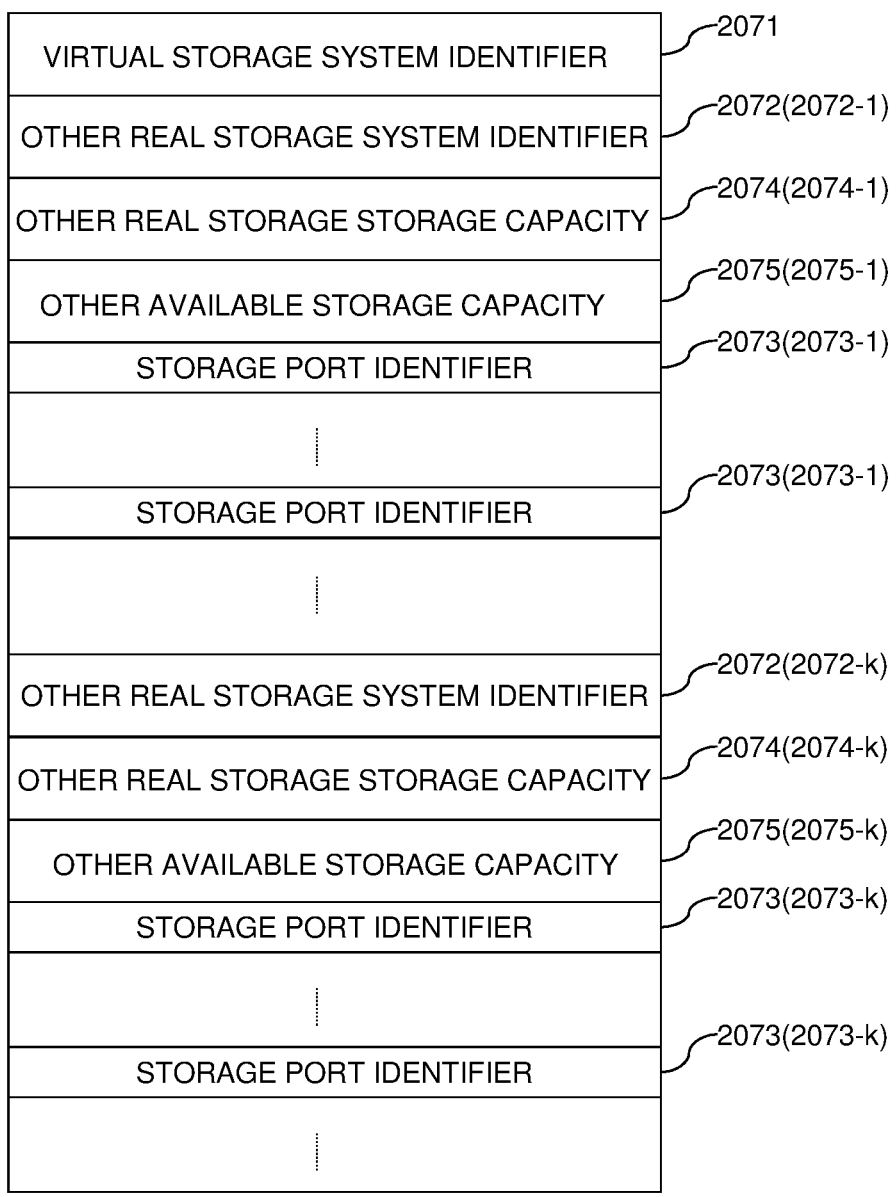
FIG. 24 is a diagram showing a format of other real storage system information in Embodiment 2.

The real storage system 100 according to Embodiment 2 includes other real storage system information 2070' instead of the other real storage system information 2070 described in Embodiment 1. FIG. 24 shows the format of the other real storage system information 2070'. The other real storage system information 2070' is information analogous to the other real storage system information 2070 described in Embodiment 1. However, the other real storage system information 2070' contains not only information contained in the other real storage system information 2070 but also other real storage storage capacity 2074 and other available storage capacity 2075. As with the other real storage system identifier 2072, the other real storage storage capacity 2074 and the other available storage capacity 2075 are information residing for each real storage system 100 residing in the virtual storage system 190, and each of them stores the same values as the pool capacity 2058 and the available storage capacity 2057 included in the real storage system 100. In FIG. 24, the other real storage storage capacity 2074 and the other available storage capacity 2075 provided for the real storage system 100 identified by the other real storage system identifier 2072-k are represented as the other real storage storage capacity 2074-k and the other available storage capacity 2075-k, respectively. In the following description, the other real storage storage capacity 2074 and the other available storage capacity 2075 provided for a certain real storage system (temporarily called "real storage X") are called "the other real storage storage capacity 2074 of the real storage X" and "the other available storage capacity 2075 of the real storage X", respectively.

In Embodiment 2, the content of the storage group information is also different from that of the storage group information 2300 described in Embodiment 1. FIG. 25 shows the format of the storage group information 2300' included in the real storage system 100 in Embodiment 2. The storage group information 2300' contains not only information contained in the storage group information 2300 described in Embodiment 1 but also an in-use page list 2200'.

The in-use page list 2200' is information for managing the real page used in the other real storage system 100 among the real pages in the management target storage group included in the real storage system 100. The in-use page list 2200' contains the pointer to the real page information 2100 on the real page used in the other real storage system 100. In a case where multiple real pages used in the other real storage system 100 reside, the storage group information 2300' contains multiple in-use page lists 2200'. In another embodiment, as with the available real page information queue including the available page management pointer 2200, the real page information 2100 on the real page used in the other real storage system 100 may be managed according to the link list structure.

Embodiment 2 and Embodiment 1 are different in logical volume information. The logical volume information in Embodiment 2 has the same format as the logical volume information 2000 in Embodiment 1 has. Consequently, in the following description, the logical volume information 2000 in Embodiment 2 is also represented as "logical volume information 2000", and the illustration with the diagrams is omitted.

However, in Embodiment 2, the content of information contained in the real page pointer 2004 is different from that described in Embodiment 1. The real page pointer 2004 in Embodiment 2 contains, first, the identifier of the real storage system 100 storing the real page, and further contains the storage group identifier 2104 and the real page address 2102 in the content of the real page information 2100 on the real page. This is because the real pages of multiple real storage systems 100 may be allocated to the logical volume in Embodiment 2 in some cases.

In Embodiment 2, the programs executed by the storage controller 200 are analogous to those described in Embodiment 1. A read process executor 4000', a write request acceptor 4100', a write-after-process executor 4200', a real storage system addition processor 4300', and a copy processor 4400' are executed. As with Embodiment 1, these programs are stored in the memory 270 of the storage controller 200 (not shown). Hereinafter, the processes executed in these programs are described. In the following description, as with Embodiment 1, terms of "own storage" and "other storage" are sometimes used. The meanings of these terms are the same as those described in Embodiment 1.

Figure 26:
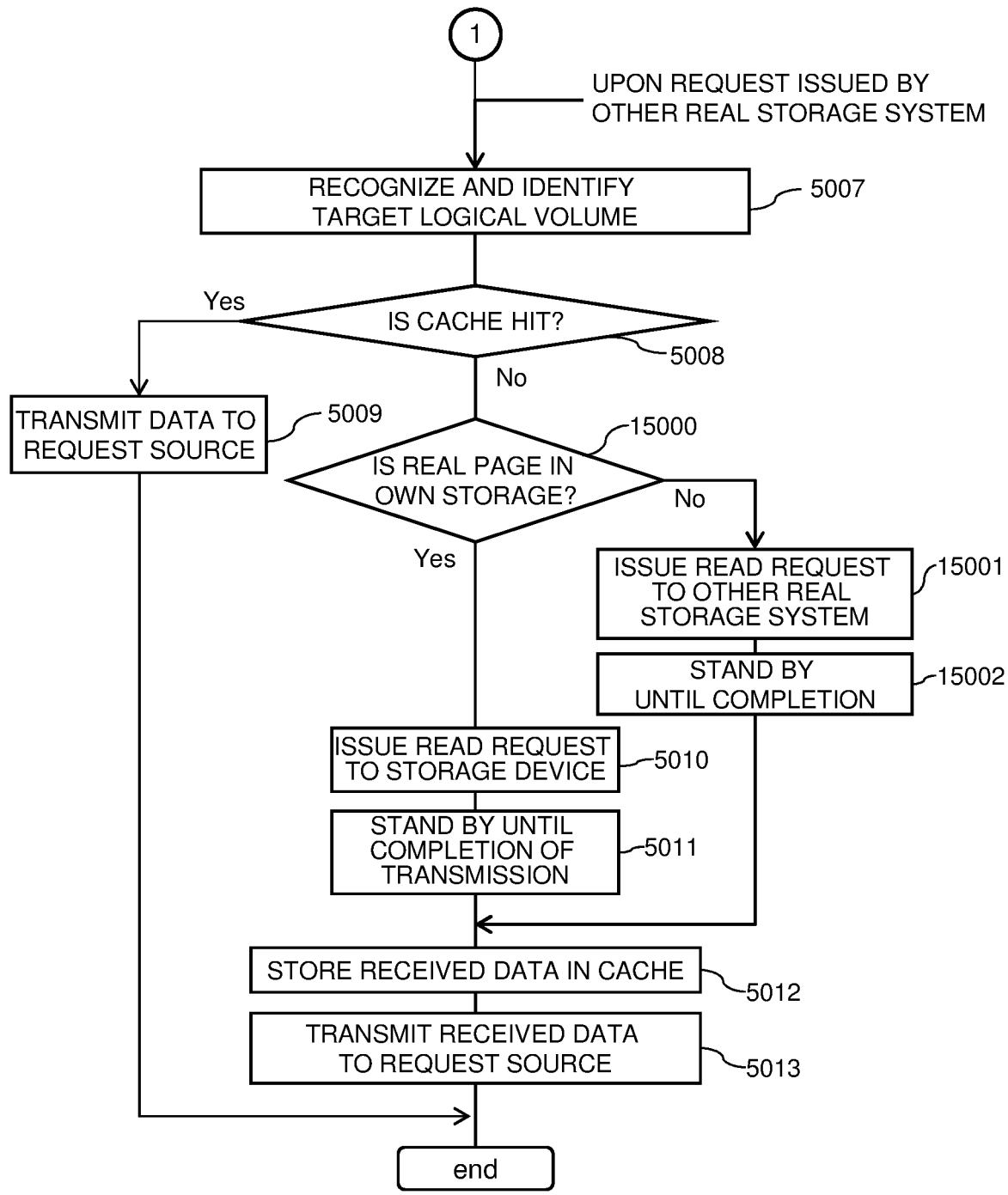
FIG. 26 is a diagram showing a processing flow (latter part) in a read process executor in Embodiment 2.

Referring to FIGS. 16 and 26, the flow of the read process executor 4000' is described. The processes performed by the read process executor 4000' are substantially identical to those of the read process executor 4000 described in Embodiment 1. At least step S000 to step S006 are the same as those described in FIG. 16. Hereinafter, referring to FIG. 26, the processes in the latter part of the read process executor 4000' (more specifically, the processes in and after step S007) are described. The processes of the latter part of the read process executor 4000' have many points common to the processes described in Embodiment 1. Consequently, hereinafter, the points different from the read process executor 4000 described in Embodiment 1 are mainly described.

Step S007 is the same as that described in Embodiment 1. Subsequently, in step S008, when the requested data does not reside in the cache 210 (step S008: No), the read process executor 4000' subsequently performs step 15000. When the requested data resides in the cache 210 (step S008: Yes), the read process executor 4000' subsequently performs step S009 and finishes the processing. Step S009 is the same as that described in Embodiment 1.

Step 15000: The read process executor 4000' refers to the real page pointer 2004 of the real page allocated to the virtual page including the area designated by the read request to thereby judge whether the real page is the real page in the own storage. More specifically, the read process executor 4000' judges whether the identifier of the real storage system 100 contained in the real page pointer 2004 is the identifier of the own storage. When the page is the real page included in the own storage (step 15000: Yes), the read process executor 4000' performs step S010 to step S013 and subsequently finishes the processing. Step S010 to step S013 are the same as those described in Embodiment 1.

Step 15001: When the real page containing the area designated by the read request is the real page in the other storage (step 15000: No), step 15001 is performed. In step 15001, the read process executor 4000' issues a read request to the real storage system 100 including the real page containing the area designated by the read request. The read request (command) issued here contains the address of the read target area. The read process executor 4000' creates a command that designates the storage group identifier 2104 and real page address 2102 contained in the real page pointer 2004 as the address of the read target area. The read process executor 4000' issues the created command to the real storage system 100 including the read target real page.

Step 15002: The read process executor 4000' stands by until the notification on completion of the processing and the read data are returned from the real storage system 100 that is the read request issuance destination. After receipt of the report of completion of the processing, the read process executor 4000' executes step S012 and step S013, and subsequently finishes the processing.

The real storage system 100 having received the read request calculates the access target storage device 160 and the access target address on the basis of the identified storage group identifier 2104 and real page address 2102, and issues a read request that designates the calculated address to the storage device 160. Subsequently, the real storage system 100 transmits the read data to the request source real storage system 100, and finishes the processing.

Figure 27:
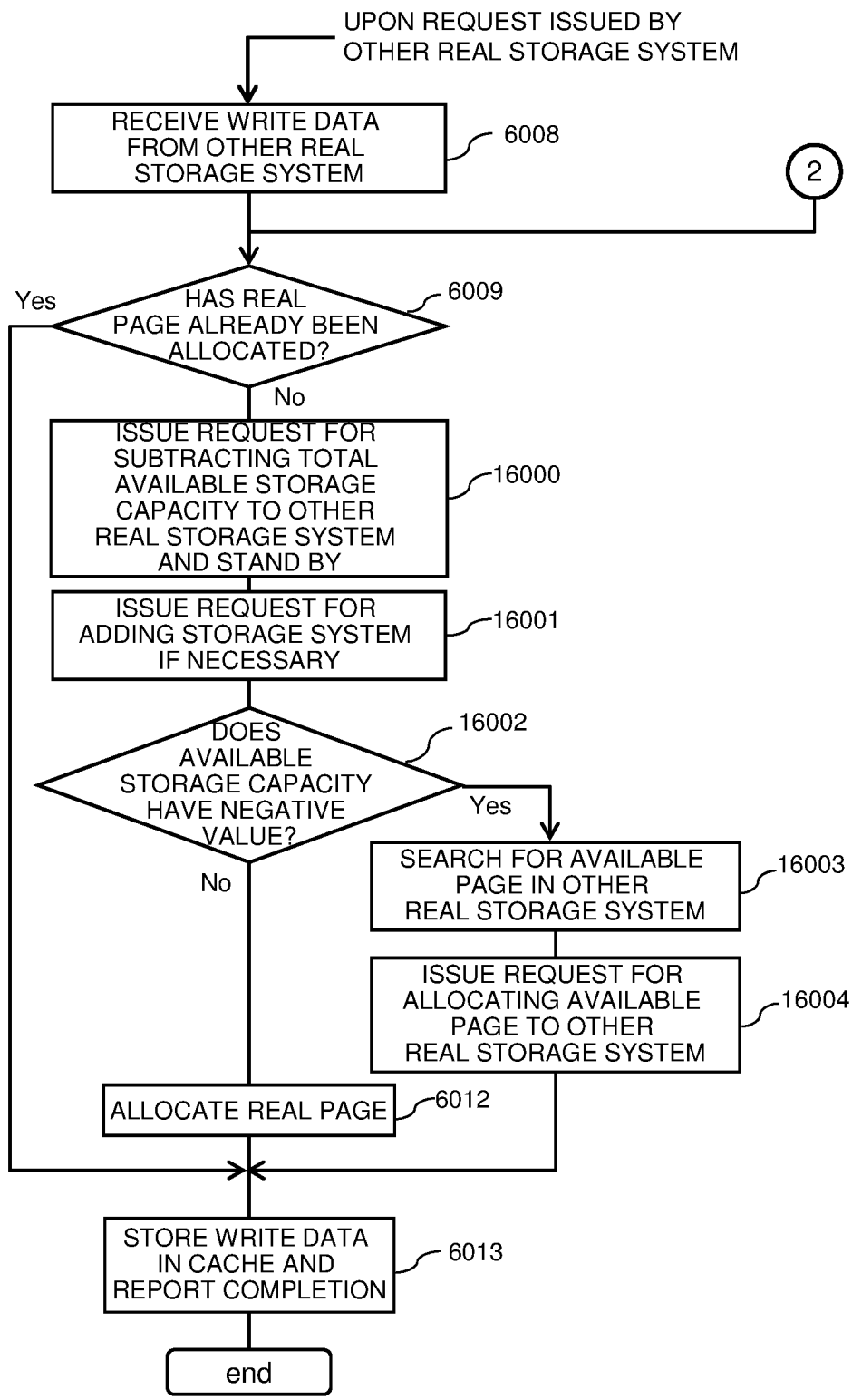
FIG. 27 is a diagram showing a processing flow (latter part) of a write request acceptor in Embodiment 2.

Subsequently, referring to FIGS. 18 and 27, the processing flow of the write request acceptor 4100' is described. Most of the processes executed by the write request acceptor 4100' are analogous to those of the write request acceptor 4100 in Embodiment 1. At least steps 6000 to 6007 are the same as those described in FIG. 18. Hereinafter, referring to FIG. 27, the processes of the latter part (more specifically, the processes in and after step 6008) are described, mainly on the difference from the processes of the write request acceptor 4100 described in Embodiment 1. In the description in FIG. 27, the own storage is sometimes called "real storage A". If not otherwise specified, the processes described in FIG. 27 are executed by the write request acceptor 4100' of the real storage A.

The write request acceptor 4100' executes the following steps instead of step 6010 and step 6011 performed by the write request acceptor 4100 in Embodiment 1.

Step 16000: When no real page is allocated to the area designated by the write request (step 6009: No), step 16000 is executed. The write request acceptor 4100' subtracts the virtual page size from the total available storage capacity 2055 and the available storage capacity 2057. Also, it issues a request for subtracting the virtual page size from the total available storage capacity 2055 and the available storage capacity of the real storage A (the other available storage capacity 2075 of the real storage A in the other real storage system information 2070' stored in the other real storage system 100) to the other real storage system 100, and stands by until the processing in the other real storage system 100 is completed.

The other storage having received the request subtracts the virtual page capacity from the total available storage capacity 2055, and further subtracts the virtual page capacity from the other available storage capacity 2075 of the real storage A. After the processing is finished, the other storage reports completion of the processing to the real storage system 100 (real storage A) having issued the request.

Step 16001: The write request acceptor 4100' checks the total available storage capacity 2055, and issues a request for adding a new real storage system 100, if necessary.

Step 16002: The write request acceptor 4100' judges whether any available page resides in the real storage A. More specifically, a case where the available storage capacity 2057 in the storage system information 2050 included in the real storage A does not have a negative value means that an available page resides, and a case of a negative value means that no available page resides. In the case where an available page resides in the real storage A, that is, in the case where the available storage capacity 2057 does not have a negative value (step 16002: No), the write request acceptor 4100' subsequently executes step 6012. Step 6012 and step 6013 are the same as those described in Embodiment 1.

Step 16003: The write request acceptor 4100' refers to the other available storage capacity 2075 in the other real storage system information 2070' to thereby check whether any available real page resides in the other storage (whether any real storage system 100 whose other available storage capacity 2075 is one or more virtual pages resides). When no real storage system 100 having an available real page is found, an error is returned to the server 110 and the write process is finished.

When the real storage system 100 having an available real page is found, the write request acceptor 4100' issues a request for allocating the available real page to the real storage system 100 including the available real page (step 16004). Before description of step 16004, first, a process performed in step 16003 when the real storage system 100 having an available real page is found is described. In the following description, the real storage system 100 to which the request for allocating the available real page is issued is represented as "real storage B".

First, the processes performed by the write request acceptor 4100' of the real storage A are described. The write request acceptor 4100' sets the available storage capacity 2057 to 0. Furthermore, the write request acceptor 4100' issues a request for setting the other available storage capacity 2075 of the real storage A to 0 and for subtracting one page from the other available storage capacity 2075 of the real storage B, to each of the other real storage systems 100 in the virtual storage system 190, and stands by until completion is returned from these real storage systems 100.

Each real storage system 100 having received the request updates the information in the other real storage system information 2070'. More specifically, each real storage system 100 sets the other available storage capacity 2075 of the real storage A to 0 and subtracts one page from the other available storage capacity 2075 of the real storage B, and after completion of these processes, notifies the real storage A of the completion (note that the other available storage capacity 2075 of the real storage B is updated only by the real storage systems 100 other than the real storage B). The details of the process executed by the real storage A in step 16003 and the processes performed by each real storage system 100 having accepted the request issued by the real storage A have thus been described.

Step 16004: The write request acceptor 4100' of the real storage A issues, to the real storage B, a request for allocating the real page, and waits for the response from the real storage B. After the real page is secured in the real storage B, information on the real page is returned as response information to the real storage A. More specifically, the information on the real page is information to be contained in the real page pointer 2004, that is, the identifier of the real storage system 100 including the real page, the identifier of the storage group 2101 where the real page resides, and the address in the storage group 2101. Upon receipt of the response information from the real storage B, the write request acceptor 4100' of the real storage A sets the received information in the real page pointer 2004.

On the other hand, the real storage B having received the request for allocating the real page from the real storage A selects appropriate storage group information 2300, selects one available real page from the available page management pointer 2200, and transmits information on the selected available real page (the identifier of the real storage system to which the available real page belongs, the identifier of the storage group, and the real page address 2102) to the real storage A. To prevent the real page selected here from being used by the real storage B or the other real storage systems 100, the real storage B removes the real page information 2100 on the available real page selected here from the available real page information queue, and preliminarily stores the pointer to the real page information 2100 in the in-use page list 2200'. The real storage B subtracts one page from the available storage capacity 2057 in the storage system information 2050.

Subsequently, the write request acceptor 4100' of the real storage A executes step 6013, and finishes the processing.

Figure 28:
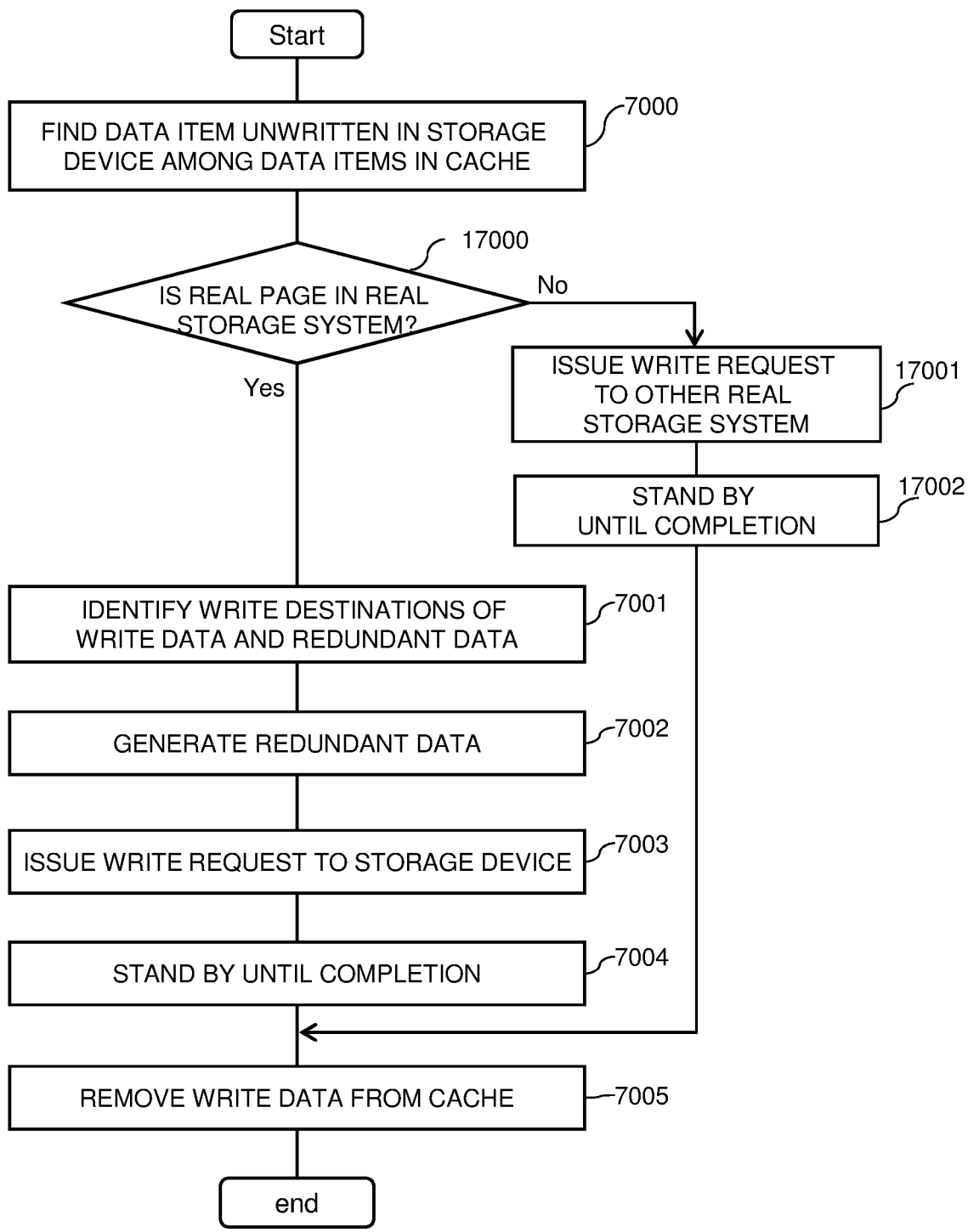
FIG. 28 is a diagram showing a processing flow of a write-after-process executor in Embodiment 2.

FIG. 28 is a diagram showing a processing flow of the write-after-process executor 4200' in Embodiment 2. In the write-after-process executor 4200', in addition to the processes executed by the write-after-process executor 4200 described in Embodiment 1, the following steps are executed. An example where data destaged by the write-after-process executor 4200' is data having a size accommodated in one virtual page in the logical volume is described here.

Step 17000: The write-after-process executor 4200' executes step 17000 after step 7000. In step 17000, the write-after-process executor 4200' identifies the virtual page that is the write destination of the write data selected in step 7000 on the basis of information added to the write data in the cache 210, and further identifies the real page pointer 2004 set in the virtual page. The write-after-process executor 4200' then judges whether the real page allocated to the virtual page is in the own storage on the basis of the content of the identified real page pointer 2004. This judgement is analogous to that performed in step 15000, for example.

In the case of the real page included in the own storage (step 17000: Yes), the write-after-process executor 4200' performs processes analogous to those in Embodiment 1 (step 7001 to step 7005).

Step 17001: In a case where the write destination of the write data selected in step 7000 is the real page of the other real storage system 100 (step 17000: No), the write-after-process executor 4200' issues a write request that designates the storage group identifier 2104 and real page address 2102 stored in the real page pointer 2004 as the write destination address, to the real storage system 100.

Step 17002: The write-after-process executor 4200' stands by until the write request issued in step 17001 is completed. After completion of the write request, the write-after-process executor 4200' executes step 7005, and finishes the processing.

The real storage system 100 having received the write request calculates the storage device 160 that is the write destination of the write data and the address in the storage device 160, on the basis of the storage group identifier 2104 and real page address 2102 designated by the write request. Subsequently, processes analogous to those in steps 7002 to 7004 in FIG. 20 are performed. After completion of writing into the storage device 160, the completion is reported to the request source real storage system 100, and the processing is finished.

Subsequently, the processing flow of the real storage system addition processor 4300' in Embodiment 2 is described. However, the processes executed by the real storage system addition processor 4300' are substantially identical to the processes of the real storage system addition processor 4300 described in Embodiment 1 (FIG. 21). Consequently, the difference is hereinafter described with reference to FIG. 21.

The processes executed in the added real storage system 100 are the same as those described in Embodiment 1 (step 8001 to step 8007 in FIG. 21). Subsequently, the processes in the other real storage system 100 (called "real storage A") that receives the notification from the added real storage system 100 are substantially identical to those described in Embodiment 1 (step 8011 to step 8022 in FIG. 21). However, the process in 8015 is different.

The real storage system addition processor 4300' of the real storage A adds the information on the added real storage system 100 to the other real storage system information 2070' in step 8015. More specifically, first, the real storage system identifier of the added real storage system 100, and the storage port identifier of the storage port 197 included in the added real storage system 100 are added. These processes are identical to the processes in step 8015 in Embodiment 1.

Furthermore, the real storage system addition processor 4300' of the real storage A sets the pool capacity 2058 of the added real storage system 100 in the other real storage capacity 2074 and other available storage capacity 2075 of the added real storage system 100 (step 8015'). The other points are the same as those described in Embodiment 1.

Subsequently, the processing flow of the copy processor 4400' is described. The processes performed by the copy processor 4400' are the same, in many parts, as the processes in the copy processor 4400 described in Embodiment 1. Consequently, the differences are mainly described below.

In this embodiment, an example is described where the real page allocated by the added real storage system 100 to the copy destination logical volume (current logical volume) is the real page included in the added real storage system 100. Alternatively, the real page of any real storage system 100 belonging to the virtual storage system 190 may be allocated. In the following description, the added real storage system 100 is represented as "real storage A", and the real storage system 100 that migrates the virtual logical volume to the real storage A is represented as "real storage B".

The processes executed by the copy processor 4400' of the real storage A are substantially identical to those described in Embodiment 1 (step 14000 to step 14010), but are different in that the following processes are performed in step 14009 and 14010.

In step 14009, first, the real storage A performs the process identical to that in Embodiment 1. Subsequently, the real storage A instructs each real storage system 100 in the virtual storage system 190 to subtract the logical capacity of the migration target logical volume from the other available storage capacity 2075 of the real storage A.

Subsequently, in step 14010, after receipt of the completion report from the real storage B (the real storage system 100 including the old logical volume), the real storage A instructs each real storage system 100 in the virtual storage system 190 to add the logical capacity of the migration target logical volume to the other available storage capacity 2075 of the real storage B. The other processes are the same as those described in Embodiment 1. Consequently, illustration of the processing flow of the copy processor 4400' with the diagram is omitted.

Figure 29:
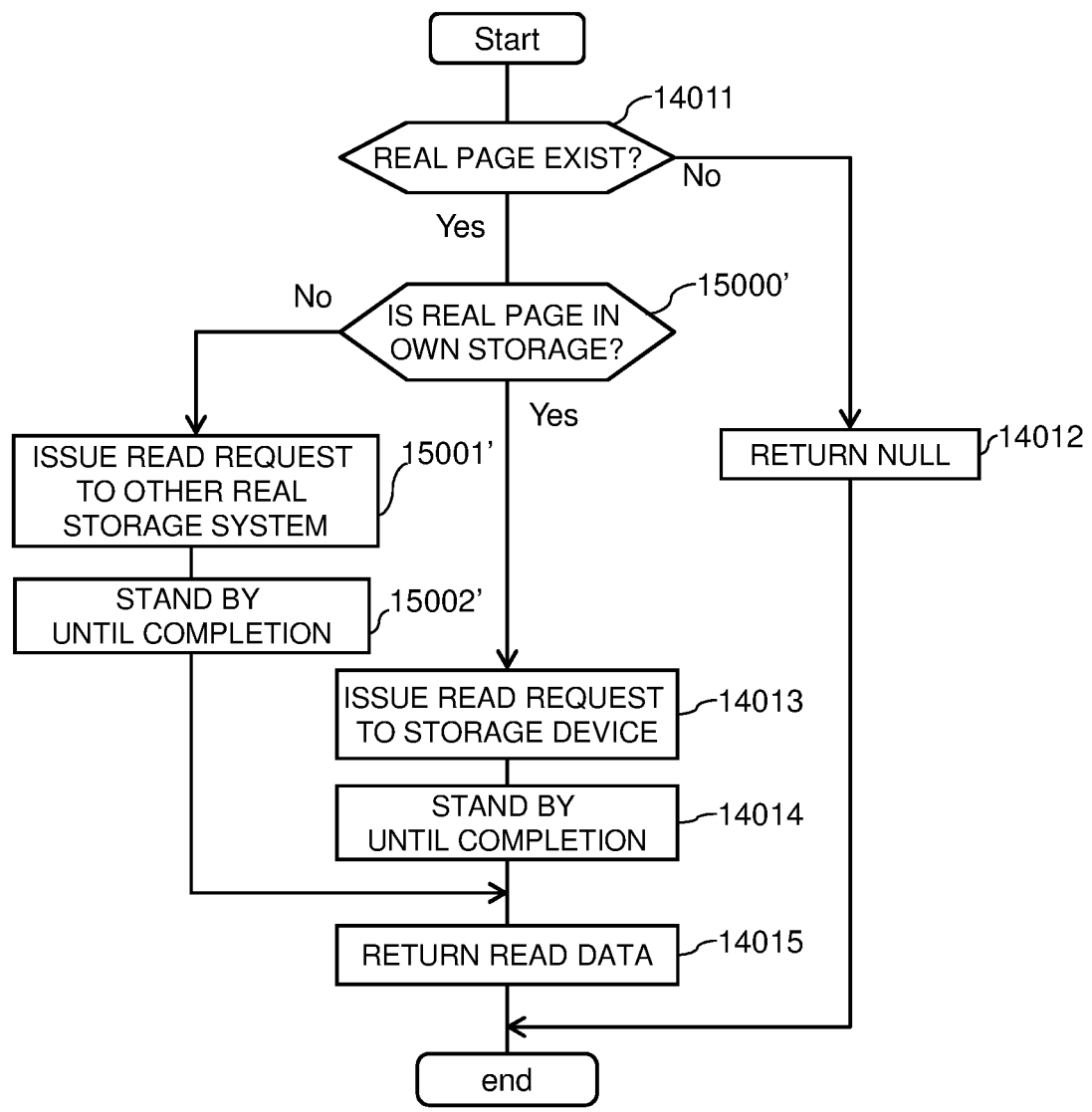
FIG. 29 is a diagram showing a processing flow of a copy processor in Embodiment 2.

FIG. 29 shows the flow of processes executed in the copy processor 4400' of the real storage system 100 (that is, the real storage system 100 including the old logical volume) having received the real page read request issued by the added real storage system 100 (step 14001). In the following description, the real storage system 100 including the old logical volume is called "request destination storage".

Step 14011: The copy processor 4400' refers to the real page pointer 2004 of the logical volume information 2000 to thereby judge whether the real page is allocated to the designated virtual page. In a case where the real page is allocated, step 15000' is subsequently performed.

Step 14012: In a case where no real page is allocated, the copy processor 4400' returns a NULL value to the request source real storage system 100 and completes the processing. This process is the same as that described in Embodiment 1.

Step 15000': Steps 15000', 15001' and 15002' are analogous to the processes performed by the read process executor 4000' (step 15000 to step 15002). That is, in step 15000', the copy processor 4400' judges whether the real page including the area designated by the read request is the real page included in the request destination storage. In the case of the real page included in the request destination storage (step 15000': Yes), the copy processor 4400' performs step 14013 to step 14015 to thereby read data from the storage device 160 in the request destination storage and to return the data to the request source real storage system 100. Step 14013 and step 14015 are the same as those described in Embodiment 1.

Step 15001': in a case where the real page including the area designated by the read request is not the real page included in the request destination storage according to the determination in step 15000' (step 15000: No), the copy processor 4400' issues a read request to the real storage system 100 that includes the real page including the area designated by the read request. This process is analogous to the process performed by the read process executor 4000' in step 15001.

Step 15002': After step 15001', the copy processor 4400' stands by until the read data is returned from the real storage system 100 to which the read request was issued. Subsequently, the data is returned to the request source real storage system 100 (step 14015), and the processing is finished.

Embodiment 2 has thus been described. The virtual storage system according to Embodiment 2 not only has the functions analogous to those of the virtual storage system according to Embodiment 1 but also is configured that it can allocate the page included in any real storage system in the virtual storage system to the virtual page of the logical volume. In the information system including multiple (real) storage systems, there may happen the case that the total of the available capacities of the storage systems is equal to or larger than the capacity of the volume that user wishes (to create) but that each of the individual real storages does not have the available capacity that user wishes. The virtual storage system according to Embodiment 2 can define the logical volume using the available areas (available pages) included in the multiple real storage systems. Consequently, this system can effectively utilize the storage area even in the case as described above.

The embodiments of the present invention have thus been described. These embodiments are examples for description of the present invention. There is no intention to limit the scope of the present invention only to the embodiments. That is, the present invention can be implemented in various other modes.

In the embodiments described above, when the real storage system is added to the virtual storage system, the server is notified of information on the virtual storage storage capacity 2053 (that is, the pool capacity of the virtual storage system), the total real storage storage capacity 2054, and the total available storage capacity 2055 (the pool available capacity of the virtual storage system). However, not all the pieces of information are necessarily informed. For example, only the pool available capacity (total available storage capacity 2055) may be notified.

In the embodiments described above, the examples have been described where the values obtained by converting the capacities (or available capacities) of the storage devices 160 belonging to the pool into the amount of virtual pages are used as the values of the virtual storage storage capacity 2053 and the total available storage capacity 2055. However, the pool capacities and the available capacities are not necessarily converted into the amounts of virtual pages. The storage system (the real storage system included in the virtual storage system) may count the capacities (or available capacity) of the storage devices 160 belonging to the pool as the capacity (or available capacity) of the pool and notify the server.

In the embodiments described above, when the real storage system is added to the virtual storage system, the information and the like on the pool available capacity of the virtual storage system is notified by the real storage system to the server. In another embodiment, instead of the real storage system's autonomous transmission of the pieces of information to the server, notification of the pieces of information may be made by the real storage system to the server upon receipt of a query by the server.

In each embodiment described above, the real storage system includes the multiple types of memories, which are the cache 210, the shared memory 220 and the memory 270. Alternatively, another embodiment may have a configuration where the storage device only includes a single type of memory. For example, a configuration of only including the memory 270 may be adopted. In this case, all the pieces of information (the write data from the server 110, and management information, such as virtual logical volume information) are stored in the identical memory 270.

The hardware configuration of the real storage system may be a configuration analogous to that of the server. For example, instead of the real storage system described in the above embodiments, a general-purpose computer, such as a personal computer, (hereinafter this is simply called "computer") may be mounted with multiple storage devices 160 (or these devices are connected thereto), and the various programs described above (the read process executor 4000, the real storage system addition processor 4300 and the like) may be executed on the computer. In this case, the computer accepts an I/O request that is for the (virtual) logical volume and issued by the server, and stores the data into the storage device or reads the data from the storage device.

In the case of the configuration where the various programs described above are executed on the computer, it may be configured so that the various program executed on the real storage system and the programs executed on the server can be executed on the identical computer. In this case, for example, it is preferred that a hypervisor program creating a virtual machine be executed on the computer to thereby create a virtual machine executing the programs (the application program 1100 and the like) executed on the server and a virtual machine executing the various programs described in the above embodiments (the programs shown in FIG. 15).

REFERENCE SIGNS LIST

100 Real storage system
110 Server
120 SAN
160 Storage device
180 Storage management server
190 Virtual storage system
195 Server port
197 Storage port
198 Server port information
200 Storage controller 210 Cache
220 Shared memory
250 Connection mechanism
260 Processor
270 Memory
275 Buffer
2050 Storage system information
2040 Virtual logical volume information
2070 Other real storage system information
2000 Logical volume information
2300 Storage group information
2500 Storage device information
4000 Read process executor
4100 Write request acceptor
4200 Write-after-process executor
4300 Real storage system addition processor
4400 Copy processor
2100 Real page information

The invention claimed is:

1. A distributed storage system comprising:
a plurality of nodes connected by a network, each node including:
a storage device for storing data; and
a controller for performing reading and writing of the data,
wherein the plurality of nodes constitute a virtual storage system managed by a common identifier, and
wherein each node:
allocates a storage area of the storage device to form a pool volume, respectively, for the storage system, and manages a capacity and an available capacity thereof,
allocates a storage area of the pool volume to form a virtual volume to be provided to an information processing device, and
receives an I/O request, determines whether or not the I/O request is directed to the virtual volume of the node itself, executes the I/O request in case the request is directed to the virtual volume of the node itself, and transfers the I/O request to another node if the I/O request received is not directed to the virtual volume of the node itself, regardless of whether the data corresponding to the request is actually located on the node itself,
wherein the distributed storage system is further configured to:
select a migration source node and a migration destination node of the plurality of nodes;
migrate a source virtual volume having a first identifier from the migration source node to a destination virtual volume of the migration destination node, update the destination virtual volume to have the first identifier, and delete the source virtual volume; and
after the source virtual volume has been migrated to the destination virtual volume, transmit data allocated to the source virtual volume from the pool volume of the migration source node to the pool volume of the migration destination node,
wherein during transmission, access requests directed to the first identifier are executed by accessing the data at the pool volume of the migration destination node if the data has already been transmitted, and by accessing the data the pool volume of the migration source node if the data has not yet been transmitted.

2. The distributed storage system according to claim 1, wherein:
at least one of the nodes is configured to:
manage a capacity and an available capacity of the plurality of nodes; and
determine a transmission of the virtual volume based on the capacity and the available capacity of the plurality of nodes.

3. The distributed storage system according to claim 1, wherein:
in a case that a node is added, the plurality of nodes are configured to:
add, to the pool volume, a storage capacity based on a storage device of an added node, and
determine a transmission of the virtual volume using an added volume as a migration destination node, and perform a transmission, and
wherein the added node adopts the common identifier of the virtual storage system.

4. The distributed storage system according to claim 3, wherein:
any one of the plurality of nodes notifies the information processing device of a capacity of the pool volume to which storage capacity has been added.

5. The distributed storage system according to claim 1, wherein:
in a case that a read request is received for data being transmitted, data for which transmission has not been completed is read from a first storage device of the migration source node, and is sent to a requester of the read request.

6. The distributed storage system according to claim 1, wherein:
in a case that a write request to overwrite data is received for data being transmitted, overwriting is performed with respect to data in the first storage device of the migration source node for which transmission has not been completed.

7. The distributed storage system according to claim 1, wherein:
in a case that a write request to overwrite data is received for data being transmitted, overwriting is performed with respect to data in a second storage device of a migration destination node for which transmission has been completed.

8. The distributed storage system according to claim 1, wherein:
in a case that data is transmitted between nodes, the plurality of nodes notify the information processing device of a change to a data access destination node.

9. In a distributed storage system having a plurality of nodes connected by a network, each of the nodes including a storage device for storing data and a controller for performing reading and writing of the data, wherein the plurality of nodes constitute a virtual storage system managed by a common identifier, a method performed by each node comprising the steps of:
allocating a storage area of the storage device to form a pool volume, respectively, for the storage system, and managing a capacity and an available capacity thereof,
allocating a storage area of the pool volume to form a virtual volume to be provided to an information processing device,
upon receiving an I/O request, determining whether or not the I/O request is directed to the virtual volume of the node itself, executing the I/O request in case the request is directed to the virtual volume of the node itself, and transferring the I/O request to another node if the I/O request received is not directed to the virtual volume of the node itself, regardless of whether the data corresponding to the request is actually located on the node itself;

selecting a migration source node and a migration destination node of the plurality of nodes;

migrating a source virtual volume having a first identifier from the migration source node to a destination virtual volume of the migration destination node, update the destination virtual volume to have the first identifier, and delete the source virtual volume; and after the source virtual volume has been migrated to the destination virtual volume, transmit data allocated to the source virtual volume from the pool volume of the migration source node to the pool volume of the migration destination node, wherein during transmission, access requests directed to the first identifier are executed by accessing the data at the pool volume of the migration destination node if the data has already been transmitted, and by accessing the data the pool volume of the migration source node if the data has not yet been transmitted.

* * * * *